United States Patent
Inagaki et al.

(10) Patent No.: US 8,337,362 B2
(45) Date of Patent: Dec. 25, 2012

(54) CONTROL DEVICE

(75) Inventors: Nobuaki Inagaki, Nishio (JP); Hiroya Ueno, Wolfsburg (DE); Kohei Tsuda, Anjo (JP); Eiji Moriyama, Okazaki (JP); Hiroshi Tsutsui, Nishio (JP)

(73) Assignee: Aisin Aw Co., Ltd., Anjo (JP)

( * ) Notice: Subject to any disclaimer, the term of this patent is extended or adjusted under 35 U.S.C. 154(b) by 487 days.

(21) Appl. No.: 12/654,505

(22) Filed: Dec. 22, 2009

(65) Prior Publication Data

US 2010/0167871 A1    Jul. 1, 2010

(30) Foreign Application Priority Data

Dec. 26, 2008 (JP) ................................. 2008-333881

(51) Int. Cl.
*B60W 10/02* (2006.01)
(52) U.S. Cl. ...................................... 477/175
(58) Field of Classification Search .................... 477/57, 477/58, 62, 64, 198, 169, 174
See application file for complete search history.

(56) References Cited

U.S. PATENT DOCUMENTS

| | | | |
|---|---|---|---|
| 6,846,265 B2 | 1/2005 | Yamamoto et al. | |
| 2005/0096182 A1* | 5/2005 | Ohta | 477/181 |
| 2006/0108163 A1* | 5/2006 | Kitano et al. | 180/65.2 |
| 2009/0259376 A1* | 10/2009 | Runde | 701/59 |

FOREIGN PATENT DOCUMENTS

| | | |
|---|---|---|
| JP | A 10-184896 | 7/1998 |
| JP | A-2003-278910 | 10/2003 |
| JP | A 2005-133782 | 5/2005 |
| JP | A 2006-153041 | 6/2006 |

OTHER PUBLICATIONS

International Search Report dated Dec. 28, 2009 for U.S. National Phase Application No. PCT/JP2009/069125.

* cited by examiner

*Primary Examiner* — David D Le
*Assistant Examiner* — David J Hlavka
(74) *Attorney, Agent, or Firm* — Oliff & Berridge, PLC

(57) ABSTRACT

A control device includes a differential rotation obtaining unit; a direct-coupling control unit that decreases the differential rotation speed by increasing an engagement pressure of the direct-coupling clutch at a normal pressure increase rate determined depending on a traveling state of a vehicle so as to change the direct-coupling clutch from a released state to an engaged state; and a pressure increase control unit that changes to a rapid pressure increase rate larger than the normal pressure increase rate for increasing the engagement pressure by the direct-coupling control unit when the differential rotation speed becomes equal to or smaller than a predetermined pressure increase permission threshold in a state that an accelerator opening of the vehicle decreases.

9 Claims, 10 Drawing Sheets

CONTROL DEVICE

CROSS-REFERENCE TO RELATED APPLICATION

The disclosure of Japanese Patent Application No. 2008-333881 filed on Dec. 26, 2008 including the specification, drawings and abstract is incorporated herein by reference in its entirety.

BACKGROUND

The present invention relates to a control device for controlling a vehicle drive apparatus which includes a fluid coupling having a direct-coupling clutch and a transmission, and outputs rotation of an input member drive-coupled to an engine and a rotary electrical machine to an output member.

In recent years, hybrid vehicles capable of improving fuel efficiency of an engine and reducing exhaust gas by using an engine and a rotary electrical machine in combination as driving force sources have been brought into practical use. As an example of a vehicle drive apparatus used in such a hybrid vehicle, Japanese Patent Application Publication No. 2003-278910 listed below describes a vehicle drive apparatus which includes a fluid coupling having a direct-coupling clutch and a transmission and outputs rotation of an input member, which is drive-coupled to an engine and a rotary electrical machine, to an output member via the fluid coupling and the transmission.

In this vehicle drive apparatus described in Japanese Patent Application Publication No. 2003-278910, when the accelerator opening is fully closed by the intention of the vehicle driver, a control device controls the direct-coupling clutch to engage regardless of whether the direct-coupling clutch is in an engaged state or released state. However, when the rotation speed of the engine drops due to full closing of the accelerator opening, and a large difference in rotation speed occurs between an input side rotation member and an output side rotation member of the fluid coupling, shock (engagement shock) may be generated in the vehicle when the direct-coupling clutch is engaged in this state, which is unfavorable. Accordingly, in the vehicle drive apparatus, when the direct-coupling clutch is changed from a released state to an engaged state, the rotation speed of the rotary electrical machine is controlled to synchronize the rotation speed of the input side rotation member of the fluid coupling to which the rotary electrical machine is drive-coupled with the rotation speed of the output side rotation member of the fluid coupling to which the transmission is drive-coupled, and then the direct-coupling clutch is engaged. This suppresses generation of shock by engaging the direct-coupling clutch in the vehicle.

SUMMARY

Generally, when the accelerator opening is decreased by the intention of the vehicle driver, a brake operation or the like may be performed thereafter for braking the vehicle. In such a situation, in a hybrid vehicle having an engine and a rotary electrical machine as driving force sources, a regeneration operation takes place accompanying deceleration of the vehicle. In this operation, for improving regeneration efficiency, it is effective to secure a state that large torque is transmitted to the rotary electrical machine as long as possible. In this aspect, in the control by the control device described in Japanese Patent Application Publication No. 2003-278910, performing the above-described synchronization control allows to start engagement of the direct-coupling clutch earlier as compared to when the synchronization control is not performed. Consequently, the time until the direct-coupling clutch is fully engaged is shortened, and by this amount, improvement in regeneration efficiency can be expected.

However, in Japanese Patent Application Publication No. 2003-278910, there is no description at all about specifically how to engage the direct-coupling clutch after the synchronization control is performed, and there is left a room for improvement regarding reduction of the time until the direct-coupling clutch is fully engaged.

The present invention has been made in view of the above-described problem, and it is an object of the present invention to provide a technology capable of improving regeneration efficiency while suppressing generation of shock due to engagement of the direct-coupling clutch.

To achieve this object, a control device according to a first aspect of the present invention controlling a vehicle drive apparatus which includes a fluid coupling having a direct-coupling clutch and a transmission, and outputs rotation of an input member drive-coupled to an engine and a rotary electrical machine to an output member has a characteristic structure including a differential rotation obtaining unit that obtains a differential rotation speed which is a difference in rotation speed between an input side of the fluid coupling drive-coupled to the input member and an output side of the fluid coupling drive-coupled to the transmission, a direct-coupling control unit that decreases the differential rotation speed by increasing an engagement pressure of the direct-coupling clutch at a normal pressure increase rate determined depending on a traveling state of a vehicle so as to change the direct-coupling clutch from a released state to an engaged state, and a pressure increase control unit that changes to a rapid pressure increase rate larger than the normal pressure increase rate for increasing the engagement pressure by the direct-coupling control unit when the differential rotation speed becomes equal to or smaller than a predetermined pressure increase permission threshold in a state that an accelerator opening of the vehicle decreases.

With the above characteristic structure, in a state that the accelerator opening is decreased when the engagement pressure of the direct-coupling clutch is increased to change the direct-coupling clutch from the released state to the engaged state, the time to increase the engagement pressure of the direct-coupling clutch to a sufficient pressure for making the direct-coupling clutch is completely engaged can be reduced, as compared to when increasing the engagement pressure at the constant normal pressure increase rate which is determined depending on a traveling state of a vehicle and does not change over time. Accordingly, a state that torque from the output member is transmitted as it is to the rotary electrical machine via the direct-coupling clutch (negative torque output by the rotary electrical machine is transmitted as it is to the output member via the direct-coupling clutch) can be established early. Therefore, a state that regeneration is performed with high efficiency can be established early, and regeneration efficiency can be improved.

Now, generally, when the direct-coupling clutch is engaged rapidly, shock (engagement shock) may be generated in the vehicle accompanying the engagement of the direct-coupling clutch. However, with the above characteristic structure, the pressure increase control unit increases the engagement pressure of the direct-coupling clutch at the rapid pressure increase rate only when the differential rotation speed becomes equal to or smaller than the predetermined pressure increase permission threshold. Thus, when the direct-coupling clutch is engaged relatively abruptly, it is possible to suppress generation of shock in the vehicle by engagement of the direct coupling clutch.

Therefore, according to the first aspect of the present invention, regeneration efficiency can be improved while suppressing generation of shock by engagement of the direct-coupling clutch.

Here, the direct-coupling control unit may increase the pressure by an amount of a predetermined pressure at the rapid pressure increase rate on the basis of the engagement pressure at a time point when the differential rotation speed becomes the pressure increase permission threshold, and thereafter turn the engagement pressure to a complete engagement pressure.

With this structure, a state that the direct-coupling clutch is completely engaged securely can be established early by determining the timing to increase the engagement pressure of the direct-coupling clutch to the complete engagement pressure based on the magnitude of an actual engagement pressure.

Further, the direct-coupling control unit may increase the pressure at the rapid pressure increase rate until a certain time elapses from a time point when the differential rotation speed becomes the pressure increase permission threshold, and thereafter turn the engagement pressure to the complete engagement pressure.

With this structure, a state that the direct-coupling clutch is completely engaged securely can be established at an appropriate timing by a relatively simple determination method, by determining the timing to increase the engagement pressure of the direct-coupling clutch to the complete engagement pressure based on a time from a time point when increase of the engagement pressure is started at the rapid pressure increase rate.

Further, the control device may further include a synchronization control unit that decreases the differential rotation speed by controlling output torque and a rotation speed of the rotary electrical machine in time with decreasing of the differential rotation speed by increasing the engagement pressure of the direct-coupling clutch.

With this structure, a time until the differential rotation speed becomes equal to or smaller than the pressure increase permission threshold can be reduced, and thus the engagement pressure of the direct-coupling clutch can be increased at the rapid pressure increase rate at an earlier timing. Therefore, a time until the direct-coupling clutch is completely engaged can be reduced, and the regeneration efficiency can be improved further.

Further, the pressure increase permission threshold may be set to a magnitude of the differential rotation speed that causes generation of shock smaller than shock generated in the vehicle by decreasing the accelerator opening when the direct-coupling clutch is engaged.

With this structure, when the engagement pressure of the direct-coupling clutch is increased at the rapid pressure increase rate and the direct-coupling clutch is engaged relatively abruptly, the shock generated in the vehicle accompanying engagement of the direct-coupling clutch can be absorbed in shock generated in the vehicle by decreasing the accelerator opening.

Further, the direct-coupling control unit may output a direct-coupling control instruction signal for engaging the direct-coupling clutch, and the direct-coupling control instruction signal may be made by regulating with one or more variables a preset reference waveform having a preliminary filling phase for filling working fluid in an engagement side oil chamber of the direct-coupling clutch and a pressure increase engagement phase for increasing an oil pressure of the working fluid to engage the direct-coupling clutch.

With this structure, by performing the preliminary operation of the direct-coupling clutch according to the preliminary filling phase of the direct-coupling control instruction signal, and performing the engagement operation according to the pressure increase engagement phase, the direct-coupling clutch can be engaged appropriately. At this time, the direct-coupling control instruction signal is generated by regulating a preset reference waveform with one or more variables. Thus, the direct-coupling clutch can be engaged more appropriately by changing a waveform of the direct-coupling control instruction signal to an optimal shape appropriately depending on the condition of the vehicle, or the like.

Further, the variables may include at least a pressure increase rate in the pressure increase engagement phase of the direct-coupling control instruction signal.

With this structure, by appropriately changing the set value of the pressure increase rate in the pressure increase engagement phase of the direct-coupling control instruction signal, the change state of the engagement pressure of the direct-coupling clutch can be controlled appropriately. Note that, with a structure further including a normal pressure increase rate and a rapid pressure increase rate as the pressure increase rate, the pressure increase rate by the pressure increase control unit can be switched easily.

Further, the variables may further include one or both of a filling pressure and a filling time in the preliminary filling phase of the direct-coupling control instruction signal.

With this structure, it is possible to establish a state that an appropriate amount of working fluid is filled in advance in the engagement side oil chamber of the direct-coupling clutch, and the direct-coupling clutch can be engaged quickly by increasing the oil pressure of the working fluid by a predetermined amount.

DETAILED DESCRIPTION OF EMBODIMENTS

1. First Embodiment

Figure 1:
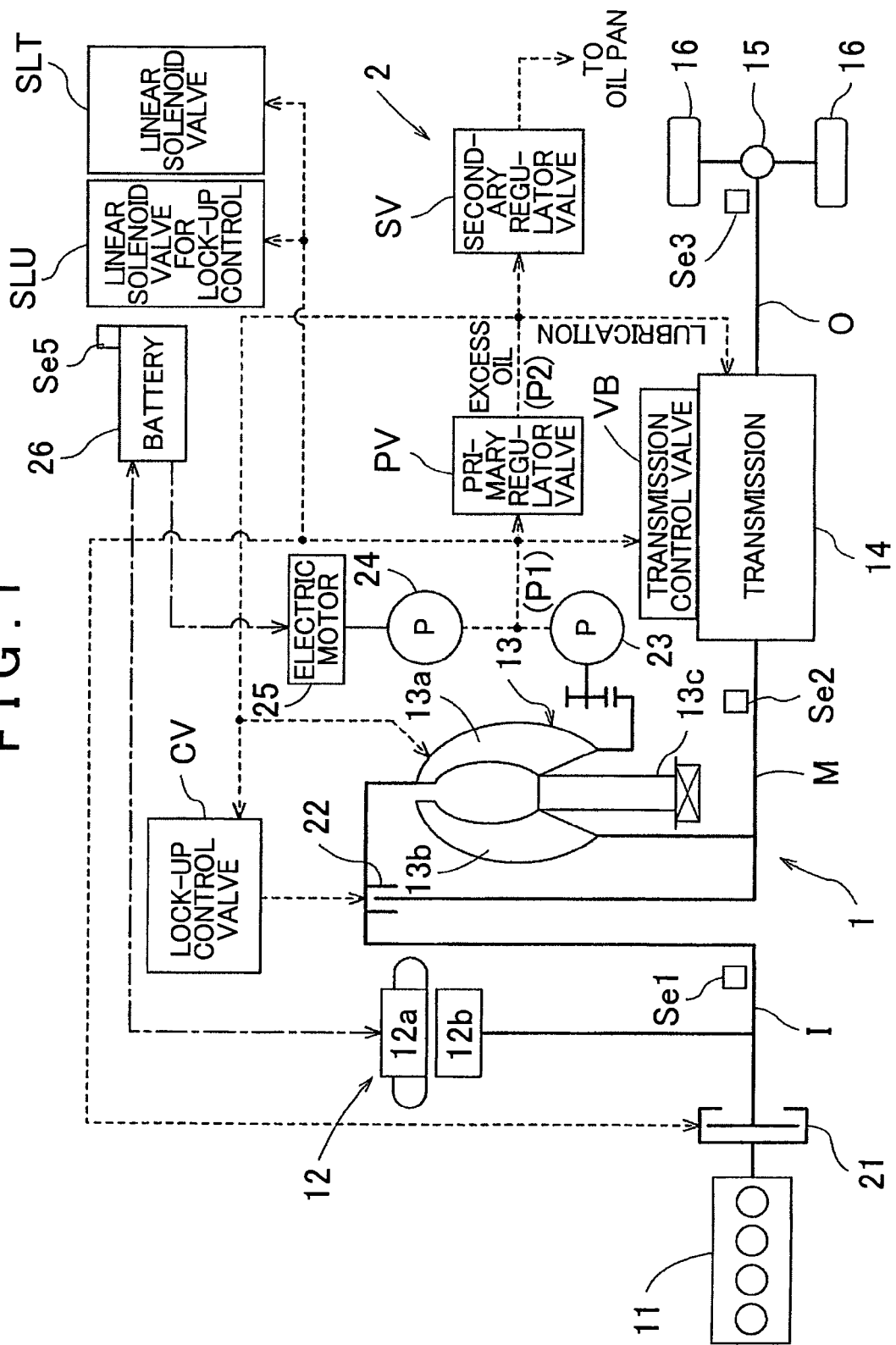
FIG. 1 is a schematic diagram showing a structure of a vehicle drive apparatus including a control device according to an embodiment.
Figure 2:
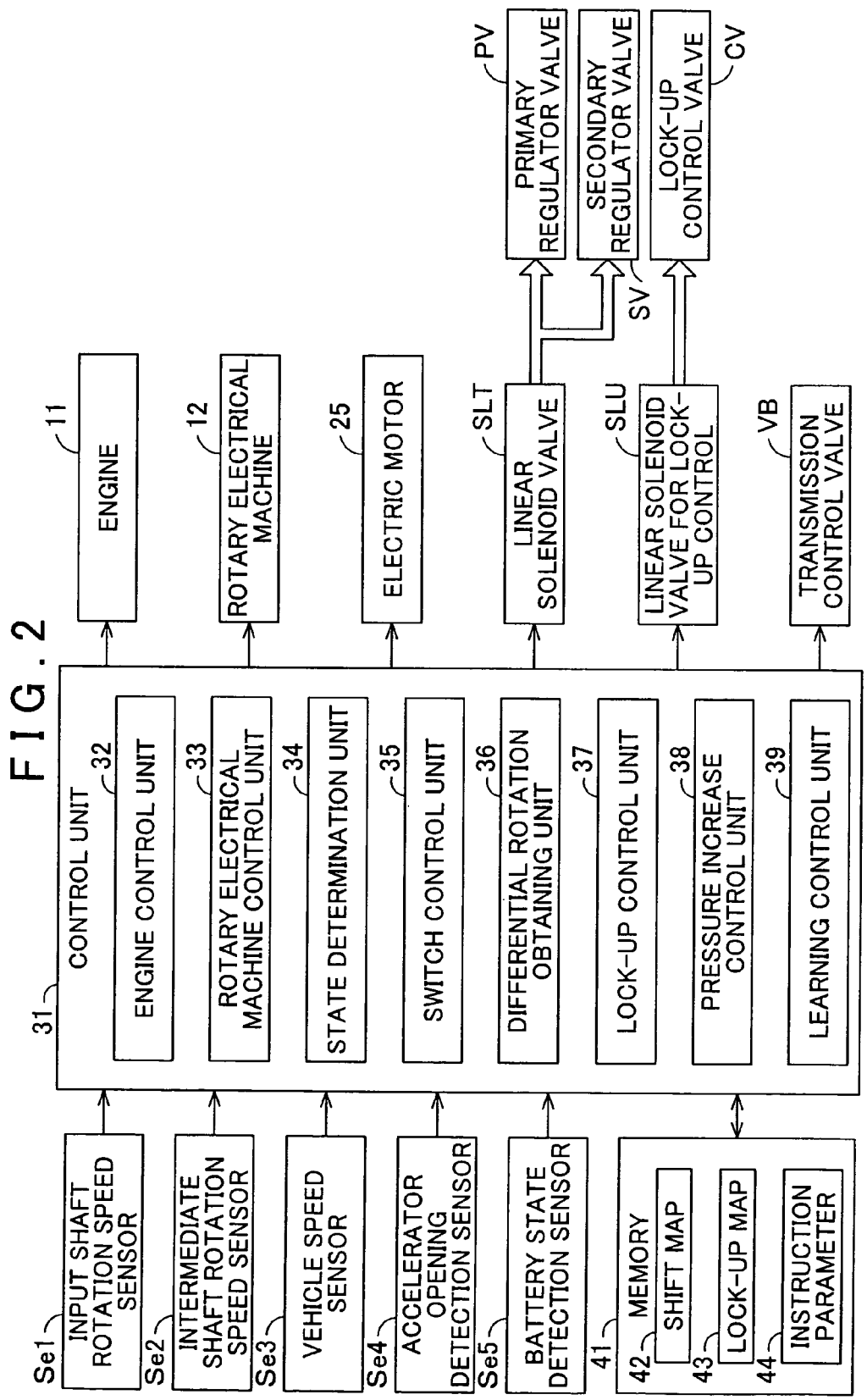
FIG. 2 is a block diagram showing a structure of a control unit according to this embodiment.

A first embodiment of the present invention will be described with reference to the drawings. In this embodiment, an example of applying a control device according to the present invention to a vehicle drive apparatus 1 for a hybrid vehicle will be described. FIG. 1 is a schematic diagram showing structures of a drive transmission system and a hydraulic control system of the vehicle drive apparatus 1 according to this embodiment. In this diagram, a solid line denotes a transmission path of a driving force, a dashed line denotes a supply path of working fluid, and a dot and dash line denotes a supply path of electric power. Note that (P1) or (P2) arranged adjacent to a dashed line denotes that the oil pressure of working fluid in the supply path is at primary oil pressure P1 or secondary oil pressure P2. As shown in this diagram, the vehicle drive apparatus 1 according to this embodiment schematically includes an engine 11 and a rotary electrical machine 12 as driving force sources and is structured such that driving forces of these driving force sources are output via a torque converter 13 and a transmission 14 and transmitted to wheels 16. Further, this vehicle drive apparatus 1 includes a hydraulic control device 2 for supplying working fluid to parts such as the torque converter 13 and the transmission 14. FIG. 2 is a block diagram showing a structure of a control unit 31 according to this embodiment. In this diagram, a solid line denotes a transmission path of a signal, and an outline arrow denotes a transmission path of a signal pressure. As shown in this diagram, the control unit 31 according to this embodiment is structured to control each part of the vehicle drive apparatus 1 including the hydraulic control device 2. In this embodiment, this control unit 31 corresponds to a "control device" according to the present invention.

1-1. The Structure of the Drive Transmission System of the Vehicle Drive Apparatus First, the structure of the drive transmission system of the vehicle drive apparatus 1 according to this embodiment will be described. As shown in FIG. 1, the vehicle drive apparatus 1 is a drive apparatus for a parallel-type hybrid vehicle having an engine 11 and a rotary electrical machine 12 as driving force sources for driving the vehicle, in which the engine 11 and the rotary electrical machine 12 are drive-coupled in series. Further, the vehicle drive apparatus 1 includes a torque converter 13 and a transmission 14, and shifts rotary driving forces of the engine 11 and the rotary electrical machine 12 as driving force sources with the torque converter 13 and the transmission 14, and transmits the shifted driving forces to an output shaft O.

The engine 11 is an internal combustion engine driven by combustion of fuel, and various types of known engines, for example, a gasoline engine and a diesel engine, can be used. In this example, an output rotation shaft of the engine 11 such as a crankshaft is drive-coupled to an input shaft I via a transmission clutch 21. Accordingly, the input shaft I is drive-coupled selectively to the engine 11 via the transmission clutch 21. This transmission clutch 21 receives supply of working fluid at the primary oil pressure P1, which will be described later, and operates while controlled with a not-shown hydraulic control valve. In addition, in another preferable structure, the output rotation shaft of the engine 11 is drive-coupled integrally to the input shaft I or is drive-coupled thereto via another member such as a damper.

The rotary electrical machine 12 has a stator 12a fixed to a not-shown case, and a rotor 12b supported rotatably inside in a radial direction of this stator 12a. The rotor 12b of this rotary electrical machine 12 is drive-coupled to the input shaft I to rotate integrally therewith. That is, in this embodiment it is structured that both the engine 11 and the rotary electrical machine 12 are drive-coupled to the input shaft I. Therefore, in this embodiment, this input shaft I corresponds to an "input member" of the present invention. The rotary electrical machine 12 is connected electrically to a battery 26 as a power storage. The rotary electrical machine 12 is capable of performing a function as a motor (electric motor) generating motive power while receiving supply of power and a function as a generator (power generator) generating electric power while receiving supply of motive power. That is, the rotary electrical machine 12 is powered to rotate by receiving electric power supply from the battery 26, or stores in the battery 26 the electric power generated by rotary driving forces transmitted from the wheels. Note that the battery 26 is an example of the power storage, and different power storage unit such as capacitor may be used, or plural types of power storage unit may be used in combination.

In this vehicle drive apparatus 1, rotary driving forces of both the engine 11 and the rotary electrical machine 12 are transmitted to the wheels 16 to enable the vehicle to travel. While traveling, depending on the state of charge of the battery 26, the rotary electrical machine 12 may be either in a state of generating a driving force by the electric power supplied from the battery 26, or in a state of generating electric power by the rotary driving force of the engine 11. Further, when the vehicle is decelerating, the transmission clutch 21 is released and the engine 11 is stopped, and the rotary electrical machine 12 turns to a state of generating electric power by the rotary driving forces transmitted from the wheels 16. The electric power generated by the rotary electrical machine 12 is stored in the battery 26. In a vehicle stop state, the transmission clutch 21 is released and the engine 11 and the rotary electrical machine 12 are stopped.

The torque converter 13 is drive-coupled to the input shaft I. The torque converter 13 is a device which transmits the rotary driving force of the input shaft I drive-coupled to the engine 11 and the rotary electrical machine 12 as driving force sources to the transmission 14 via an intermediate shaft M. The torque converter 13 includes a pump impeller 13a as an input side rotation member drive-coupled to the input shaft I, a turbine runner 13b as an output side rotation member drive-coupled to the intermediate shaft M, and a stator 13c provided therebetween and having a one-way clutch. Then the torque converter 13 transmits a driving force between the pump impeller 13a on the driving side and the turbine runner 13b on the driven side via the working fluid filled therein. In this embodiment, this torque converter 13 corresponds to a "fluid coupling" in the present invention.

Here, the torque converter 13 includes a lock-up clutch 22 as a friction engagement element for locking up. This lock-up clutch 22 is a clutch for coupling the pump impeller 13a and the turbine runner 13b to make them rotate integrally, so as to increase transmission efficiency by eliminating a rotation difference (slip) between the pump impeller 13a and the turbine runner 13b. Therefore, in a state that the lock-up clutch 22 is engaged, the torque converter 13 directly transmits the driving force of the driving force source (input shaft I) to the transmission 14 (intermediate shaft M) without intervention of working fluid. In this embodiment, this lock-up clutch 22 corresponds to a "direct-coupling clutch" in the present invention. The torque converter 13 including the lock-up clutch 22 is supplied with working fluid at the secondary oil pressure P2, which will be described later.

The transmission 14 is drive-coupled to the intermediate shaft M as the output shaft of the torque converter 13. The transmission 14 is a device which shifts the rotary driving force from the input shaft I transmitted via the torque converter 13 and transmits the shifted driving force to the output shaft O on the side of the wheels 16. Here, the transmission 14 is a multi-stage automatic transmission having plural shift speeds (multi-speed transmission). In this embodiment, the transmission 14 includes three shift speeds (first speed, second speed, and third speed) with different change gear ratios (not shown). To form the three shift speeds, the transmission 14 includes a gear mechanism such as a planetary gear mechanism and a plurality of friction engagement elements such as clutches and brakes, for engaging or releasing rotation elements of this gear mechanism to switch the shift speed. The transmission 14 shifts the rotation speed of the intermediate shaft M by a predetermined change gear ratio set for each shift speed, and converts torque and transmits the converted torque to the output shaft O as an output member. The rotary driving force transmitted from the transmission 14 to the output shaft O is then transmitted to the wheels 16 via a differential 15. Note that the structure in this example is a uniaxial structure in which all of the input shaft I, the intermediate shaft M, and the output shaft O are arranged coaxially.

1-2. The Structure of the Hydraulic Control Device

Next, the hydraulic control device 2 forming the hydraulic control system of the above-described vehicle drive apparatus 1 will be described. This hydraulic control device 2 has two types of pumps, a mechanical pump 23 and an electric pump 24, as shown in FIG. 1, as oil pressure sources for sucking in working fluid stored in a not-shown oil pan and supplying the oil to respective parts of the vehicle drive apparatus 1 of the vehicle. Here, the mechanical pump 23 is an oil pump operated by a rotary driving force of the input shaft I (the engine 11 and the rotary electrical machine 12 as driving force sources). As such a mechanical pump 23, for example, a gear pump or a vane pump may be used preferably. In this example, the mechanical pump 23 is drive-coupled to the input shaft I via the pump impeller 13a of the torque converter 13, and is driven by the rotary driving force of one or both of the engine 11 and the rotary electrical machine 12. The mechanical pump 23 basically has a discharge capability sufficiently higher than the amount of working fluid necessary for the vehicle drive apparatus 1. However, the mechanical pump 23 does not discharge the working fluid when the input shaft I is stopped (that is, when the vehicle is stopped). Further, the mechanical pump 23 discharges the working fluid while the input shaft I rotates at low speed (that is, when the vehicle is traveling at low speed), but there may be a situation that the pump is unable to supply a necessary amount of oil for the vehicle drive apparatus 1. Accordingly, this vehicle drive apparatus 1 includes the electric pump 24 as a pump for assisting the mechanical pump 23.

The electric pump 24 is an oil pump which operates by a driving force of an electric motor 25 for driving pump irrelevantly to the rotary driving force of the input shaft I (driving force source). As this electric pump 24 also, for example, a gear pump or a vane pump may be used preferably. The electric motor 25 driving the electric pump 24 is connected electrically to the battery 26, and generates a driving force by receiving supply of electric power from the battery 26. This electric pump 24 is a pump for assisting the mechanical pump 23, and operates in a state that a necessary amount of oil is not supplied from the mechanical pump 23 when the vehicle is stopped or traveling at low speed. Due to such a nature as an auxiliary pump, as well as for reducing size and weight and decreasing power consumption of the electric motor 25, a pump having a smaller discharge capability than the mechanical pump 23 is used as the electric pump 24.

Further, the hydraulic control device 2 has a primary regulator valve PV and a secondary regulator valve SV as regulator valves for adjusting the oil pressure of working fluid, which is supplied from the mechanical pump 23 and the electric pump 24, to a predetermined pressure. The primary regulator valve PV adjusts the oil pressure of working fluid, which is supplied from the mechanical pump 23 and the electric pump 24, to the primary oil pressure P1. The secondary regulator valve SV adjusts the pressure of excess oil from the primary regulator valve PV to the secondary oil pressure P2. Therefore, the secondary oil pressure P2 is set to a lower value than the primary oil pressure P1. The primary oil pressure P1 corresponds to a line pressure as a reference oil pressure of the vehicle drive apparatus 1, and the value thereof is determined based on a signal pressure supplied from the linear solenoid valve SLT.

As shown in FIG. 2, the signal pressure from the common linear solenoid valve SLT for adjusting oil pressure is supplied to the primary regulator valve PV and the secondary regulator valve SV. As shown in FIG. 1, according to the supplied signal pressure, the primary regulator valve PV adjusts to the primary oil pressure P1 the oil pressure of working fluid supplied from the mechanical pump 23 and the electric pump 24 on the upstream side (the side of the mechanical pump 23 and the electric pump 24) of the primary regulator valve PV. Here, the primary regulator valve PV adjusts the amount of discharging working fluid, which is supplied from the mechanical pump 23 and the electric pump 24, to the secondary regulator valve SV side based on the balance between the signal pressure supplied from the linear solenoid valve SLT and a feedback pressure of the primary oil pressure P1 after being adjusted by the primary regulator valve PV. That is, the primary regulator valve PV increases the amount of discharging working fluid to the secondary regulator valve SV side when the amount of working fluid supplied from the mechanical pump 23 and the electric pump 24 is large. On the other hand, when the amount of working fluid supplied from the mechanical pump 23 and the electric pump 24 is small, the primary regulator valve PV decreases the amount of working fluid to be discharged to the secondary regulator valve SV side. Thus, the oil pressure of working fluid on the upstream side of the primary regulator valve PV is adjusted to the primary oil pressure P1 according to the signal pressure.

According to the signal pressure supplied from the linear solenoid valve SLT, the secondary regulator valve SV adjusts the oil pressure of excess oil discharged from the primary regulator valve PV, that is, the oil pressure on the downstream side (on the secondary regulator valve SV side) of the primary regulator valve PV and on the upstream side (the primary regulator valve PV side) of the secondary regulator valve SV to the predetermined secondary oil pressure P2. Here, the secondary regulator valve SV adjusts the amount of discharging (draining) the excess working fluid discharged from the primary regulator valve PV to the oil pan based on the balance between the signal pressure supplied from the linear solenoid valve SLT and a feedback pressure of the secondary oil pressure P2 after being adjusted by the secondary regulator valve SV. That is, the secondary regulator valve SV increases the amount of working fluid to be discharged to the oil pan when the amount of excess oil from the primary regulator valve PV is large. On the other hand, when the amount of working fluid supplied from the primary regulator valve PV is small, the secondary regulator valve SV decreases the amount of working fluid to be discharged to the oil pan. Thus, the oil pressure of working fluid on the upstream side of the secondary regulator valve SV is adjusted to the secondary oil pressure P2 according to the signal pressure.

The linear solenoid valve SLT receives, as shown in FIG. 1, supply of working fluid at the primary oil pressure P1 after being adjusted by the primary regulator valve PV, and adjusts, as shown in FIG. 2, a valve opening according to an SLT instruction value output from the control unit 31, thereby outputting working fluid at the signal pressure according to the SLT instruction value. Here, the signal pressure output from the linear solenoid valve SLT has a value basically in proportion to the SLT instruction value. The working fluid at the signal pressure output from the linear solenoid valve SLT is supplied to the primary regulator valve PV and the secondary regulator valve SV. Therefore, here the signal pressure of the same value is supplied to each of the primary regulator valve PV and the secondary regulator valve SV. Thus, the control unit 31 is structured to control the primary regulator valve PV and the secondary regulator valve SV for adjusting to the primary oil pressure P1 and the secondary oil pressure P2 according to the output SLT instruction value. The SLT instruction value serving as a control signal of the linear solenoid valve SLT is determined by the control unit 31 based on various vehicle information such as traveling load and acceleration opening, and then output to the linear solenoid valve SLT. The SLT instruction value output from the control unit 31 is, specifically, an electric current value which determines the opening of the linear solenoid valve SLT.

The working fluid at the primary oil pressure P1 adjusted by the primary regulator valve PV is supplied to the plurality of friction engagement elements of the transmission 14 via a transmission control valve VB. The transmission control valve VB is a valve for controlling operation of engaging or releasing each of the plurality of friction engagement elements of the transmission 14, and is constituted by a plurality of control valves corresponding respectively to the friction engagement elements, and so on. By opening and closing the plurality of control valves according to a control instruction value output from the control unit 31, this transmission control valve VB supplies the working fluid at the primary oil pressure P1 adjusted by the primary regulator valve PV to respective oil chambers of the friction engagement elements, thereby controlling operation of engaging or releasing the friction engagement elements. In addition, the working fluid at the primary oil pressure P1 is supplied also to the transmission clutch 21 and so on. Further, the working fluid at the secondary oil pressure P2 adjusted by the secondary regulator valve SV is supplied to lubricating oil paths of the transmission 14, the torque converter 13, a lock-up control valve CV for controlling the lock-up clutch 22, and so on.

The lock-up control valve CV is an operation control valve for engaging or releasing the lock-up clutch 22. This lock-up control valve CV is supplied with a signal pressure from a linear solenoid valve SLU for lock-up control. The lock-up control valve CV opens/closes according to the supplied signal pressure to supply the working fluid at the secondary oil pressure P2 adjusted by the secondary regulator valve SV to an oil chamber of the lock-up clutch 22, thereby controlling operation of engaging or releasing the lock-up clutch 22. In addition, similarly to the linear solenoid valve SLT for adjusting oil pressure, the linear solenoid valve SLU for lock-up control receives supply of the working fluid at the primary oil pressure P1 after being adjusted by the primary regulator valve PV, and adjusts a valve opening according to a control instruction signal output from the control unit 31, thereby outputting working fluid at the signal pressure according to the control instruction signal.

1-3. The Structure of the Control Unit

Next, the structure of the control unit 31 according to this embodiment will be described. The control unit 31 included in the vehicle drive apparatus 1 performs a function as a core unit performing operation control of each part of the vehicle drive apparatus 1, as shown in FIG. 2. This control unit 31 has an arithmetic processing unit such as a CPU as a core unit, and is structured to include storage devices such as a RAM (random access memory) structured such that data can be read therefrom and written thereto by the arithmetic processing unit, and a ROM (read only memory) structured such that data can be read therefrom by the arithmetic processing unit, and so on (not shown). Software (program) stored in the ROM or the like, or hardware provided separately such as an arithmetic circuit, or both form the functional units 32 to 39 of the control unit 31. These functional units 32 to 39 are structured to be able to exchange information with each other. Further, a memory 41 is structured to include a storage medium, such as a flash memory, in which information can be stored or rewritten as a hardware structure, and is structured such that information can be exchanged with the control unit 31. This memory 41 may be provided in the storage device included in the control unit 31.

Further, as shown in FIG. 1 and FIG. 2, this vehicle drive apparatus 1 includes a plurality of sensors provided in respective units, specifically, an input shaft rotation speed sensor Se1, an intermediate shaft rotation speed sensor Se2, a vehicle speed sensor Se3, an accelerator opening detection sensor Se4, and a battery state detection sensor Se5. Here, the input shaft rotation speed sensor Se1 detects the rotation speed of the input shaft I. In this embodiment, the input shaft I is drive-coupled to the pump impeller 13a of the torque converter 13. Therefore, the rotation speed detected by this input shaft rotation speed sensor Se1 is the rotation speed on the input side of the torque converter 13. The intermediate shaft rotation speed sensor Se2 detects the rotation speed of the intermediate shaft M. In this embodiment, the intermediate shaft M is drive-coupled to the turbine runner 13b of the torque converter 13. Therefore, the rotation speed detected by this intermediate shaft rotation speed sensor Se2 is the rotation speed on the output shaft side of the torque converter 13. The vehicle speed sensor Se3 detects the rotation speed of the wheels 16, that is, the vehicle speed. The accelerator opening detection sensor Se4 detects the accelerator opening by detecting an operation amount of a not-shown accelerator pedal. The battery state detection sensor Se5 detects a battery state of the battery 26, such as a charge amount, a voltage value, and the like. Information indicating detection results by these sensors Se1 to Se5 is output to the control unit 31.

As shown in FIG. 2, the control unit 31 has an engine control unit 32, a rotary electrical machine control unit 33, a state determination unit 34, a switch control unit 35, a differential rotation obtaining unit 36, a lock-up control unit 37, a pressure increase control unit 38, and a learning control unit 39. Further, the memory 41 to which the functional units 32 to 39 of the control unit 31 refer stores a shift map 42, a lock-up map 43, and an instruction parameter 44. Details of the functional units 32 to 39 of the control unit 31 will be described below.

The engine control unit 32 is a functional unit performing operation control of the engine 11. The engine control unit 32 performs processing to determine an engine operation point and control the engine 11 to operate at the determined engine operation point. Here, the engine operation point is a control instruction value representing a control target point of the engine 11, and is determined by rotation speed and torque. More particularly, the engine operation point is an instruction value representing a control target point of the engine 11 determined in consideration of a vehicle required output (determined based on vehicle required torque and engine rotation speed) and optimum fuel efficiency, and is determined by a rotation speed instruction value and a torque instruction value. The engine control unit 32 then controls the engine 11 to operate at the torque and rotation speed indicated by the engine operation point.

The rotary electrical machine control unit 33 is a functional unit performing operation control of the rotary electrical machine 12. The rotary electrical machine control unit 33 performs processing to determine a rotary electrical machine operation point and control the rotary electrical machine 12 to operate at the determined rotary electrical machine operation point. Here, the rotary electrical machine operation point is a control instruction value representing a control target point of the rotary electrical machine 12, and is determined by rotation speed and torque. More particularly, the rotary electrical machine operation point is an instruction value representing a control target point of the rotary electrical machine 12 determined in consideration of the vehicle required output and the engine operation point, and is determined by the rotation speed instruction value and the torque instruction value. The rotary electrical machine control unit 33 controls the rotary electrical machine 12 so as to operate by torque and at rotation speed indicated by the rotary electrical machine operation point. The rotary electrical machine control unit 33 also performs control to switch a state that the rotary electrical machine 12 generates a driving force by electric power supplied from the battery 26 and a state that the rotary electrical machine 12 generates power by the rotary driving force of the engine 11, depending on the amount of charge in the battery 26 detected by the battery state detection sensor Se5.

In this embodiment, when the lock-up control unit 37 which will be described later controls the lock-up control valve CV to engage the lock-up clutch 22, the rotary electrical machine control unit 33 is able to decrease the difference in rotation speed between the pump impeller 13a as an input side rotation element of the torque converter 13 and the turbine runner 13b as an output side rotation element, by controlling the output torque and the rotation speed of the rotary electrical machine 12. That is, the rotary electrical machine control unit 33 increases/decreases the rotation speeds of the input shaft I drive-coupled to the rotor 12b and the pump impeller 13a, by controlling the output torque and the rotation speed of the rotary electrical machine 12, so as to control the rotation speed of the pump impeller 13a to be close to the rotation speed of the turbine runner 13b. Note that the rotary electrical machine control unit 33 is structured to also control the rotation speed of the electric motor 25 for driving the electric pump 24.

Figure 3:
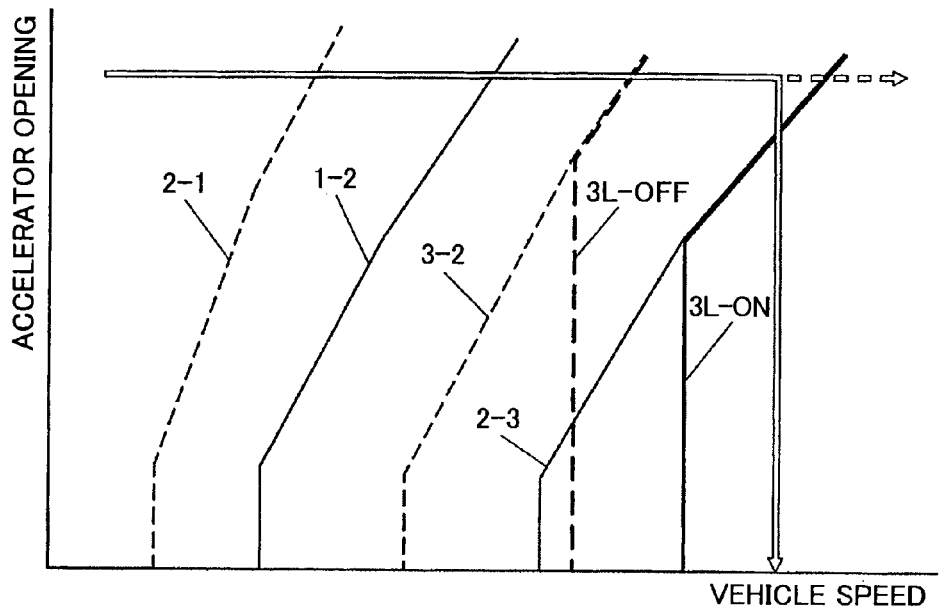
FIG. 3 is a chart showing an example of a shift map according to this embodiment.

The state determination unit 34 is a functional unit for determining a shift speed in the transmission 14 and an operation state of the lock-up clutch 22 based on the accelerator opening and the speed of the vehicle. To determine such a shift speed and an operation state of the lock-up clutch 22, the state determination unit 34 refers to the shift map 42 and the lock-up map 43 stored in the memory 41. FIG. 3 is a chart showing an example of the shift map 42 and the lock-up map 43 according to this embodiment. Here, the shift map 42 and the lock-up map 43 are overlapped as one map (hereinafter, this overlapped map may also be referred to as a "shift map 42"), but the maps may be structured to be stored separately from each other. The shift map 42 is a map in which shift schedules of the shift speeds in the transmission 14 are set based on the accelerator opening and the vehicle speed. As shown in this diagram, plural upshift lines and plural downshift lines are set, which are represented by straight lines generally increasing rightward (the accelerator opening increases as the vehicle speed increases). Here, the upshift lines define shift schedules from a low shift speed to a high shift speed between two adjacent shift speeds in the transmission 14, and the downshift lines define shift schedules from a high shift speed to a low shift speed. In this embodiment, since the transmission 14 has three shift speeds, there are set an upshift line from the first speed to the second speed, an upshift line from the second speed to the third speed, a downshift line from the second speed to the first speed, and a downshift line from the third speed to the second speed. Here, the upshift indicates switching to a shift speed having a smaller speed change ratio (speed reduction ratio), and the downshift indicates switching to a shift speed having a larger speed change ratio (speed reduction ratio).

In the lock-up map 43, lock-up schedules of the lock-up clutch 22 are set based on the accelerator opening and the vehicle speed. As shown in this chart, there are set an on-lock line and an off-lock line, which are represented by combinations of a straight line substantially in parallel with the vertical axis (at constant vehicle speed) and a straight line rising rightward. Here, the on-lock line defines a shift schedule of the lock-up clutch 22 from a released state to an engaged state, and the off-lock line defines a shift schedule of the lock-up clutch 22 from an engaging state to a released state. In this embodiment, the lock-up clutch 22 is structured to be kept in the released state when the shift speed is the first speed or the second speed, and only the on-lock line and the off-lock line when the shift speed is the third speed is set.

The switch control unit 35 is a functional unit performing control of switching the shift speed of the transmission 14 by controlling operation of the transmission control valve VB according to the shift speed determined by the state determination unit 34. To perform such control, the linear solenoid valve SLT is connected to the control unit 31. The switch control unit 35 outputs an SLT instruction signal as a control signal to the linear solenoid valve SLT. According to this SLT instruction signal, the primary regulator valve PV and the secondary regulator valve SV are controlled, and the primary oil pressure P1 and the secondary oil pressure P2 are adjusted. The working fluid adjusted to the primary oil pressure P1 is supplied to the transmission control valve VB. The plural control valves are operated according to control instruction values as a control signal output from the switch control unit 35 to the transmission control valve VB, and operation control of engaging or releasing the friction engagement elements of the transmission 14 is performed.

Figure 4:
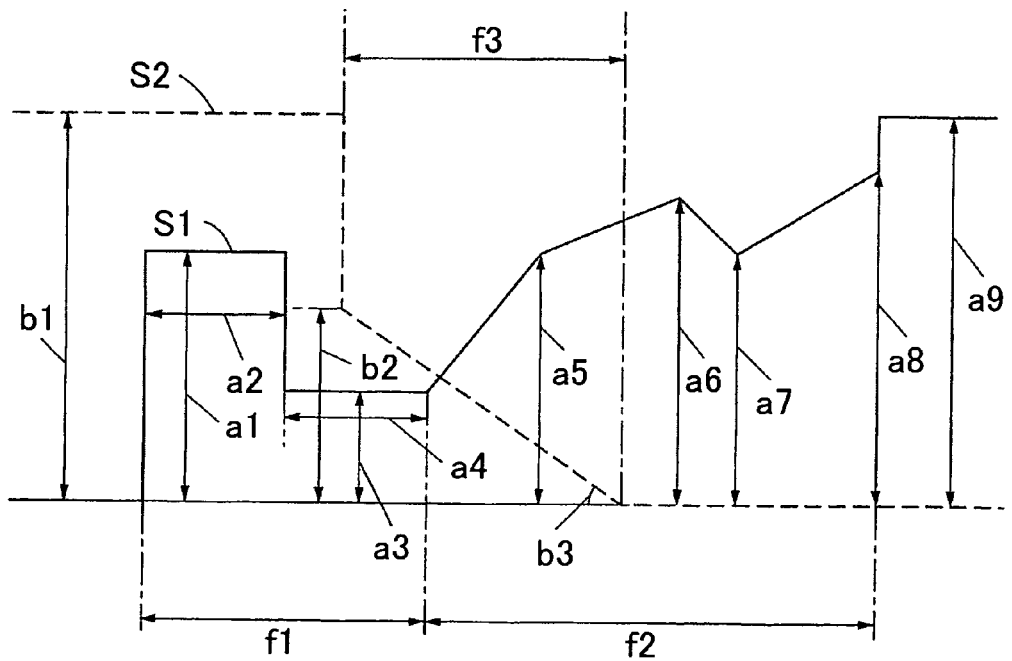
FIG. 4 is a schematic chart showing an engagement side control instruction signal and a release side control instruction signal according to this embodiment.

The control signal output from the switch control unit 35 to the transmission control valve VB includes an engagement side control instruction signal S1 for friction engagement elements on the engagement side and a release side control instruction signal S2 for friction engagement elements on the release side. As shown in FIG. 4, the engagement side control instruction signal S1 has a preliminary filling phase f1 for filling working fluid in oil chambers of the friction engagement elements on the engagement side, and a pressure increase engagement phase f2 for increasing an engagement pressure of the friction engagement elements on the engagement side by increasing the oil pressure of working fluid filled in the oil chambers. This engagement side control instruction signal S1 is generated by regulating a preset reference waveform with one or more instruction parameters 44. As such instruction parameters 44, in this embodiment, there are set a filling pressure a1, a filling time a2, a maintained pressure a3 and a maintained time a4 in the preliminary filling phase f1 of the engagement side control instruction signal S1 are set, and target engagement pressures a5 to a8 and a complete engagement pressure a9 in the pressure increase engagement phase f2. Accordingly, the engagement side control instruction signal S1 is generated with a waveform according to the set values of the instruction parameters (a1 to a9) while based on the preset reference waveform.

The release side control instruction signal S2 has a pressure reduction release phase f3 which decreases engagement pressures of the friction engagement elements on the side released by decreasing the oil pressure of working fluid filled in the oil chambers. This release side control instruction signal S2 is generated by regulating a preset reference waveform with one or more instruction parameters 44. As such instruction parameters 44, in this embodiment, there are set a complete engagement pressure b1, a pressure reduction start pressure b2, and a pressure reduction rate b3 in the pressure reduction release phase f3 of the release side control instruction signal S2. Accordingly, the release side control instruction signal S2 is generated with a waveform according to the set values of the instruction parameters (b1 to b3) while based on the preset reference waveform. The generated engagement side control instruction signal S1 and release side control instruction signal S2 are output to the transmission control valve VB, thereby controlling the engagement pressure of the friction engagement elements. Then the engagement pressure of the friction engagement elements on the engagement side increases to a predetermined value or larger, and the engagement pressure of the friction engagement elements on the release side decreases to a predetermined value or lower, thereby performing what is called a changeover shift. Note that in this embodiment, it is assumed that the shift operation (upshift operation or downshift operation) is completed when the engagement pressure of the friction engagement element on the engagement side becomes the complete engagement pressure a9 according to the engagement side control instruction signal S1.

The differential rotation obtaining unit 36 is a functional unit which obtains a differential rotation speed DN that is a difference in rotation speed between the input side of the torque converter 13 that is drive-coupled to the input shaft I and the output side of the torque converter 13 that is drive-coupled to the transmission. In this embodiment, this differential rotation obtaining unit 36 corresponds to a "differential rotation obtaining unit" in the present invention. Based on the rotation speed of the pump impeller 13a drive-coupled to the input shaft I, which is detected by the input shaft rotation speed sensor Se1, and the rotation speed of the turbine runner 13b drive-coupled to the intermediate shaft M, which is detected by the intermediate shaft rotation speed sensor Set, the differential rotation obtaining unit 36 calculates and obtains the differential rotation speed DN between the rotation speed of the pump impeller 13a and the rotation speed of the turbine runner 13b. Here, the differential rotation speed DN is obtained as an absolute value of the difference therebetween. Information of the obtained differential rotation speed DN is output to the rotary electrical machine control unit 33, the lock-up control unit 37, and the pressure increase control unit 38.

The lock-up control unit 37 is a functional unit controlling the operation state of the lock-up clutch 22 according to the operation state determined by the state determination unit 34. Here, the lock-up clutch 22 can take one of "released state", "half-engaged state", and "completely engaged state" as the operation state thereof. The "released state" represents a state that the lock-up clutch 22 is not engaged at all. In this released state, rotation of the input shaft I is transmitted to the intermediate shaft M via the torque converter 13. The "completely engaged state" represents a state that the lock-up clutch 22 is engaged completely. In this completely engaged state, input shaft I and the intermediate shaft M integrally rotate with the differential rotation speed DN being zero. The "half-engaged state" is a state between the released state and the completely engaged state, and represents a state that the lock-up clutch 22 is engaged incompletely. In this half-engaged state, the input shaft I and the intermediate shaft M rotate integrally while slipping with a given differential rotation speed DN.

The lock-up control unit 37 controls switching of the operation state of the lock-up clutch 22 among the "released state", the "half-engaged state", and the "completely engaged state" by controlling operation of the lock-up control valve CV. To perform such control, the linear solenoid valve SLU for lock-up control is connected to the control unit 31. The lock-up control unit 37 outputs a lock-up control instruction signal S3 to the linear solenoid valve SLU for lock-up control. The linear solenoid valve SLU supplies the signal pressure for controlling the lock-up control valve CV according to this lock-up control instruction signal S3. The lock-up control valve CV is then controlled according to the signal pressure, thereby performing operation control of engaging or releasing the lock-up clutch 22.

Figure 5:
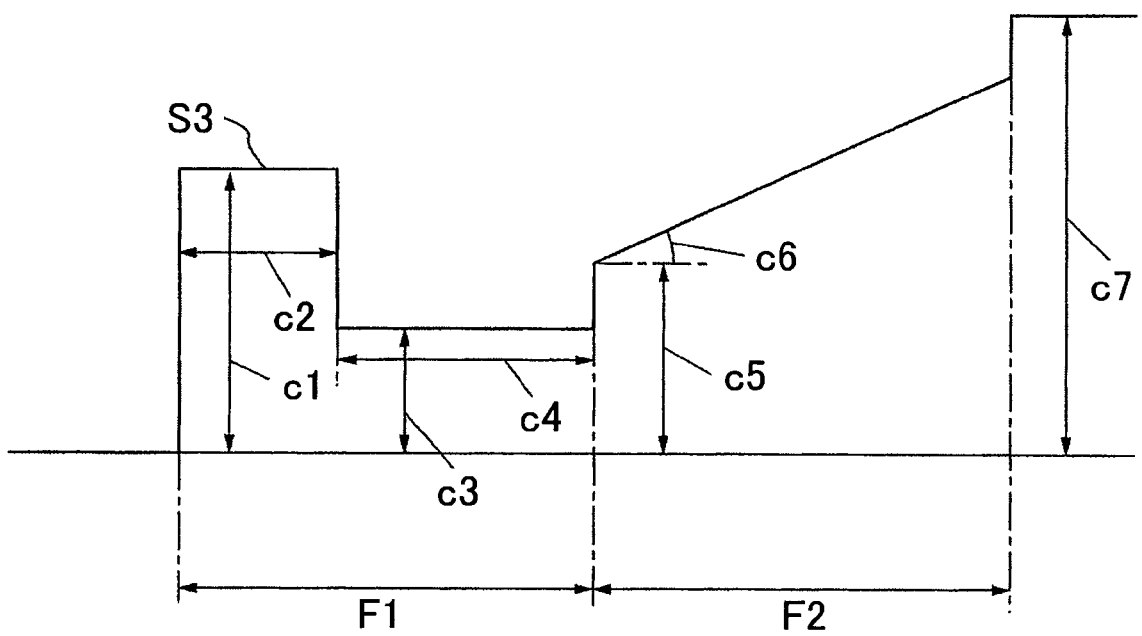
FIG. 5 is a schematic chart showing a lock-up control instruction signal according to this embodiment.

As shown in FIG. 5, the lock-up control instruction signal S3 has the preliminary filling phase F1 for filling working fluid in the engagement side oil chamber of the lock-up clutch 22 and the pressure increase engagement phase F2 for engaging the lock-up clutch 22 by increasing the oil pressure of working fluid filled in the engagement side oil chamber. This lock-up control instruction signal S3 is generated by regulating a preset reference waveform with one or more instruction parameters 44. In this embodiment, the instruction parameters 44 correspond to "variables" in the present invention. As such instruction parameters 44, in this embodiment, there are set a filling pressure c1, a filling time c2, a maintained pressure c3, and a maintained time c4 in the preliminary filling phase F1 of the lock-up control instruction signal S3, as well as a pressure increase start pressure c5, a pressure increase rate (normal pressure increase rate, which will be described later) c6, a rapid pressure increase rate c6' and a complete engagement pressure c7 in the pressure increase engagement phase F2. Accordingly, the lock-up control instruction signal S3 having a waveform according to set values of the instruction parameters (c1 to c7) is generated on the basis of the preset reference waveform. The generated lock-up control instruction signal S3 is output to the linear solenoid valve SLU for lock-up control as described above, and converted by the linear solenoid valve SLU into a signal pressure for controlling the lock-up control valve CV. Therefore, a "direct-coupling control instruction signal" in the present invention includes a signal pressure obtained by converting the lock-up control instruction signal S3 into an oil-pressure signal, besides the lock-up control instruction signal S3 in this embodiment.

Next, operation states of the lock-up clutch 22 controlled by the lock-up control instruction signal S3 and the signal pressure corresponding thereto (which may also be simply referred to as "lock-up control instruction signal S3" below) will be described. In the preliminary filling phase F1 of the lock-up control instruction signal S3, the working fluid controlled at the filling pressure c1 is supplied to the engagement side oil chamber of the lock-up clutch 22. Thereafter, the working fluid is maintained at the maintained pressure c3 only for the maintained time c4. In this state, the lock-up clutch 22 is not engaged at all and is in the "released state". However, since the working fluid maintained at the maintained pressure c3 is filled in the engagement side oil chamber of the lock-up clutch 22, it is a state that the lock-up clutch 22 can be engaged quickly only by increasing the oil pressure of working fluid by a predetermined amount. Therefore, a "preliminary operation" in the present invention is performed by controlling the lock-up clutch 22 according to the preliminary filling phase F1 of the lock-up control instruction signal S3.

In the pressure increase engagement phase F2 of the lock-up control instruction signal S3, the working fluid is increased to the pressure increase start pressure c5, and thereafter increased gradually at the pressure increase rate c6. At this time, in the initial stage of increase of the pressure, the lock-up clutch 22 is not completely engaged and is in a "half-engaged state". In this "half-engaged state", the differential rotation speed DN obtained by the differential rotation obtaining unit 36 has a predetermined value. As the oil pressure (engagement pressure) of working fluid increases gradually, the differential rotation speed DN decreases gradually and becomes small. Then, when the differential rotation speed DN becomes zero, the lock-up clutch 22 is engaged completely and turns to the "completely engaged state". Therefore, the differential rotation speed DN is decreased by increasing the engagement pressure of the lock-up clutch 22 according to the pressure increase engagement phase F2 of the lock-up control instruction signal S3, thereby changing the lock-up clutch 22 from the released state to the engaged state. Thus, the "engagement operation" in the present invention is performed. Thereafter, the oil pressure of working fluid is increased to the complete engagement pressure c7, making a state that the "completely engaged state" is surely maintained.

Note that upshift of the shift speed and engagement of the lock-up clutch may be requested almost simultaneously during traveling of the vehicle. For example, as shown by an outlined arrow and an outlined dashed arrow on the shift map 42 in FIG. 3, when crossing almost simultaneously the upshift line from the second speed to the third speed and the on-lock line when the shift speed is at the third speed, the state determination unit 34 determines to upshift from the second speed to the third speed of the transmission 14 and change the lock-up clutch 22 from the released state to the engagement state, based on the shift map 42. Note that the outlined arrow denotes a situation that the determination as described above is made in a state that the accelerator opening decreases, and the outlined dashed arrow denotes a situation that the determination as described above is made while the accelerator opening has a predetermined amount and is in a constant state. In such a situation, the lock-up control unit 37 is structured to perform first control processing regarding an upshift operation of the shift speed and an engagement operation of the lock-up clutch 22 and further perform second control processing, depending on the situation. The specific processing contents of these first control processing and second control processing will be described below in detail.

In the first control processing, control of adjusting timings of performing the upshift operation of shift speed and the engagement operation of the lock-up clutch 22 is performed. These operation timings are adjusted according to a state of change of the accelerator opening, the differential rotation speed DN between the input shaft I and the intermediate shaft M, and so on. First, when the state determination unit 34 determines to upshift the shift speed and change the lock-up clutch 22 from the released state to the engaged state in a state that the accelerator opening detected by the accelerator opening detection sensor Se4 is constant or increased, the lock-up control unit 37 engages the lock-up clutch 22 after the upshift operation of shift speed is finished. However, when the accelerator opening is constant in a state of being zero, control in a state that the accelerator opening decreases, which will be described later, is performed exceptionally.

Figure 6:
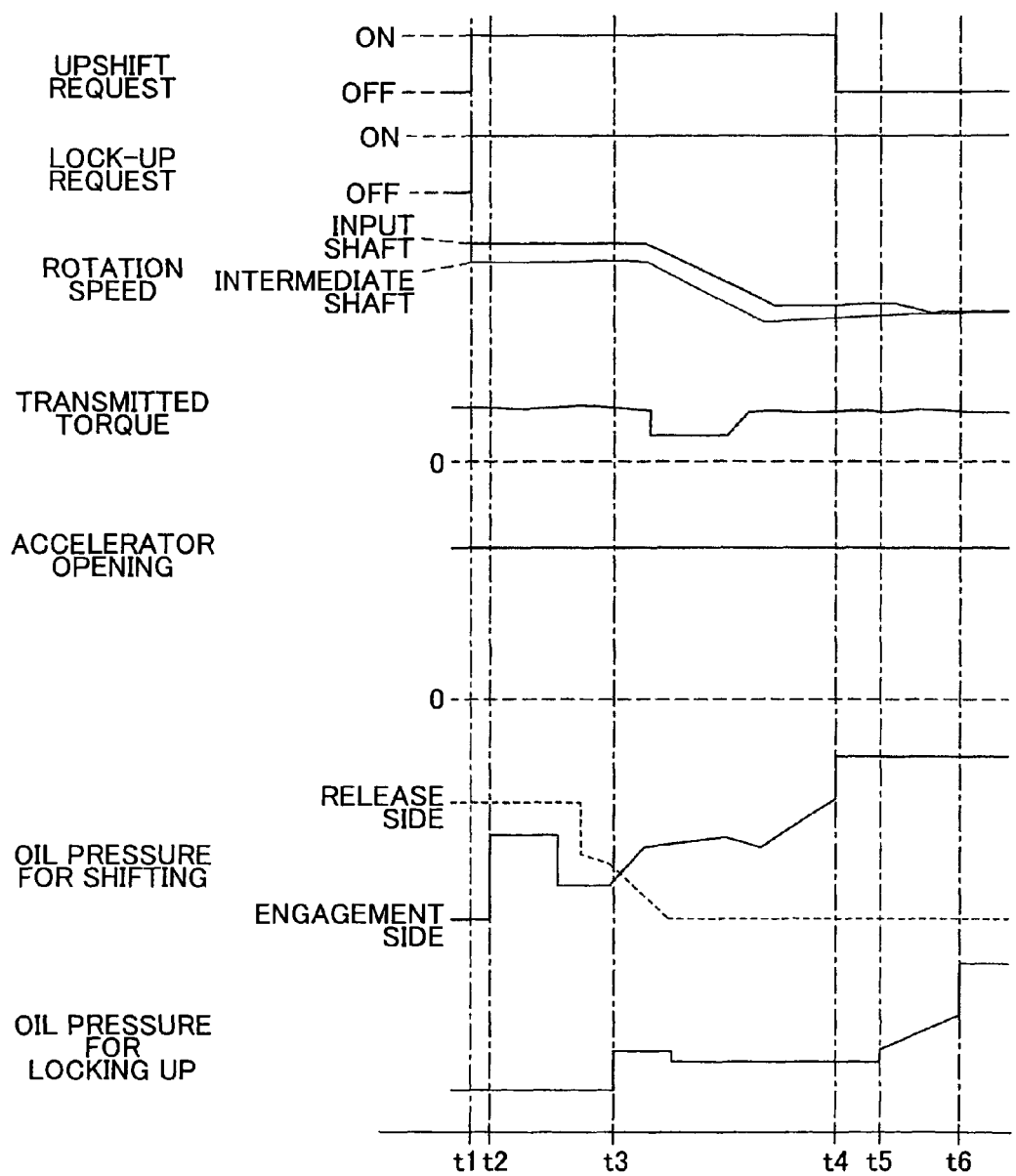
FIG. 6 is a timing chart for describing first control processing (when accelerator is on) according to this embodiment.

FIG. 6 is a timing chart for describing the first control processing in a state that the accelerator opening is constant or increased. In FIG. 6, from the top in order, there are shown upshift request, lock-up request, rotation speeds of the input shaft I and the intermediate shaft M, transmitted torque (torque to be transmitted to the input side of the transmission 14), accelerator opening, engagement pressure controlled by the engagement side control instruction signal S1 and engagement pressure controlled by the release side control instruction signal S2, and oil pressure controlled by the lock-up control instruction signal S3. At time t1, the state determination unit 34 determines to upshift the shift speed and change the lock-up clutch 22 from the released state to the engaged state, and the upshift request and the lock-up request is turned on. Then, at time t2, preliminary filling of working fluid in the engagement side friction engagement elements is started, and a shift operation is started. Thereafter, at time t3 in the shift operation, preliminary filling of working fluid in the lock-up clutch 22 is started. At time t4, the engagement pressure of working fluid in the engagement side friction engagement elements becomes the complete engagement pressure, and the shift operation is finished. As the shift operation is finished, the upshift request is also turned off. Thereafter, from time t5, the oil pressure of working fluid to the lock-up clutch 22 is increased gradually, changing the lock-up clutch from the released state through the half-engaged state. At time t6, the oil pressure of working fluid is increased to the complete engagement pressure, thereby changing the lock-up clutch to the completely engaged state.

In this manner, by engaging the lock-up clutch 22 after the shift operation (here the upshift operation of shift speed) is finished, the rotation of the intermediate shaft M and variation of the transmitted torque accompanying the shift operation are transmitted to the input shaft I via the torque converter 13, and thus generation of shock (shift shock) by shifting speed in the vehicle can be suppressed.

On the other hand, when the state determination unit 34 determines to upshift the shift speed and change the lock-up clutch 22 from the released state to the engaged state in a state that the accelerator opening detected by the accelerator opening detection sensor Se4 is decreased or a state that the accelerator opening is zero and constant, the lock-up control unit 37 engages the lock-up clutch 22 irrelevantly to an upshift operation of shift speed under the condition that the differential rotation speed DN is not larger than an engagement permission threshold C1. That is, unlike the control in the above-described state that the accelerator opening is constant or increased, the lock-up clutch 22 is engaged regardless of whether or not the shift operation (here the upshift operation of shift speed) is finished. In this embodiment, the lock-up control unit 37 engages the lock-up clutch 22 before an upshift operation of shift speed is finished. More specifically, at substantially the same time as the determination by the state determination unit 34 to change the lock-up clutch 22 from the released state to the engaged state, the lock-up control unit 37 outputs the lock-up control instruction signal S3 for making the preliminary operation be performed immediately, and increases the oil pressure of working fluid to engage the lock-up clutch 22 before the upshift operation of shift speed is finished.

Here, the engagement permission threshold C1, which defines one criterion of conditions for engaging the lock-up clutch 22 irrelevantly to the upshift operation of shift speed by the lock-up control unit 37, is set to the magnitude of the differential rotation speed DN that causes generation of smaller shock than the shock generated in the vehicle by decreasing the accelerator opening when the lock-up clutch 22 is engaged. That is, the engagement permission threshold C1 is set to the magnitude of the differential rotation speed DN at which shock generated when the lock-up clutch 22 is engaged becomes smaller than shock generated in the vehicle by decreasing the accelerator opening.

Figure 7:
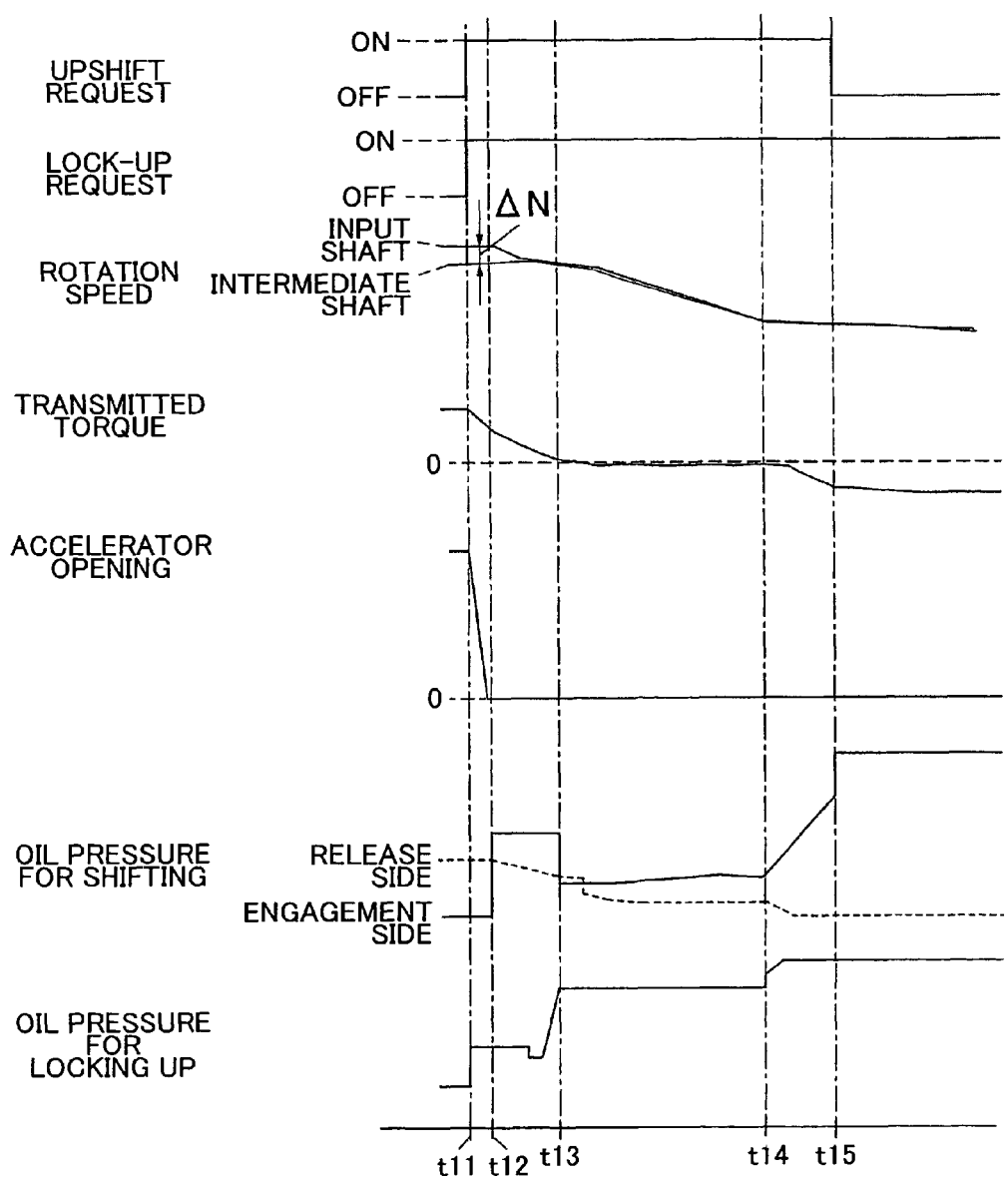
FIG. 7 is a timing chart for describing first control processing (when accelerator is off) according to this embodiment.

FIG. 7 is a timing chart for describing the first control processing in a state that the accelerator opening is decreased (here, the accelerator opening has changed to a fully closed state). In FIG. 7, similarly to FIG. 6, from the top in order, there are shown upshift request, lock-up request, rotation speeds of the input shaft I and the intermediate shaft M, transmitted torque (torque to be transmitted to the input side of the transmission 14), accelerator opening, engagement pressure controlled by the engagement side control instruction signal S1 and engagement pressure controlled by the release side control instruction signal S2, and oil pressure controlled by the lock-up control instruction signal S3. Note that it is assumed that the differential rotation speed DN is not larger than the engagement permission threshold C1. At time t11, the state determination unit 34 determines to upshift the shift speed and change the lock-up clutch 22 from the released state to the engaged state, and the upshift request and the lock-up request is turned on. At the same time, preliminary filling of working fluid in the lock-up clutch 22 is started. At time t12, preliminary filling of working fluid in the engagement side friction engagement elements is started, and a shift operation is started. Thereafter, at time t13 by which the preliminary filling of working fluid in the engagement side friction engagement elements is performed and the upshift operation of shift speed is not finished yet, the oil pressure of working fluid to the lock-up clutch 22 is increased rapidly, thereby turning to the completely engaged state. Furthermore, at time t14, the oil pressure of working fluid is increased to the complete engagement pressure. At time t15, the engagement pressure of working fluid to the engagement side friction engagement elements becomes the complete engagement pressure, and the shift operation is finished. As the shift operation is finished, the upshift request is also turned off.

Note that in a state that the accelerator opening is decreased (particularly, the accelerator opening has changed to a fully closed state) when the state determination unit 34 determines to upshift the shift speed and change the lock-up clutch 22 from the released state to the engaged state, the driver thereafter may perform a brake operation or the like for braking the vehicle. In such a situation, a regeneration operation takes place accompanying deceleration of the vehicle. However, if there is performed control as described above in a state that the accelerator opening is constant or increased, a certain time is required for completely engaging the lock-up clutch 22. Then, during this time, the torque transmitted from the wheels 16 is transmitted to the rotary electrical machine 12 via the torque converter 13, and thus the regeneration efficiency decreases. In this aspect, in this embodiment, the lock-up control unit 37 engages the lock-up clutch 22 before the shift operation is finished in such a situation. Accordingly, a state that the torque transmitted from the wheels 16 is transmitted as it is to the rotary electrical machine 12 via the lock-up clutch 22 can be established early. Therefore, a state that the regeneration can be performed with high efficiency can be established early. FIG. 7 shows how regeneration is performed by the rotary electrical machine 12 with the transmitted torque being negative before the time t15 when the upshift operation of shift speed is finished.

At this time, the lock-up control unit 37 engages the lock-up clutch 22 only when the differential rotation speed DN is equal to or smaller than the engagement permission threshold C1. Thus, even when the lock-up clutch 22 is engaged irrelevantly to the finish of the shift operation, shock generated in the vehicle accompanying the engagement operation of the lock-up clutch 22 can be absorbed in shock generated in the vehicle by decreasing the accelerator opening.

In the first control processing described above, the lock-up clutch 22 is engaged early by engaging the lock-up clutch 22 irrelevantly to the upshift operation of shift speed in a state that the accelerator opening detected by the accelerator opening detection sensor Se4 is decreased. However, since it is under the condition that the differential rotation speed DN is not larger than the engagement permission threshold C1, there may occur a situation that such control cannot be performed. For example, accompanying full closing of the accelerator opening, when the rotation speed of the input shaft I significantly decreases below the rotation speed of the intermediate shaft M, and the differential rotation speed DN becomes equal to or larger than the engagement permission threshold C1, the lock-up control unit 37 cannot engage the lock-up clutch 22 irrelevantly to the upshift operation of shift speed, even if the state determination unit 34 determines to upshift the shift speed and change the lock-up clutch 22 from the released state to the engaged state in a state that the accelerator opening is decreased. Accordingly, in the case where the differential rotation speed DN is larger than the engagement permission threshold C1, when the engagement pressure of the lock-up clutch 22 is increased after the upshift operation of shift speed is finished similarly to the first control operation in a state that the accelerator opening is constant or increased, the lock-up clutch 22 cannot be engaged early.

Accordingly, in this embodiment, in a state that the accelerator opening is decreased and when the differential rotation speed DN is larger than the engagement permission threshold C1, the second control processing is performed for quickly changing from the released state to the completely engaged state with respect to engagement operation of the lock-up clutch 22. To perform such control, in the second control processing, when the differential rotation speed DN becomes equal to or smaller than a predetermined pressure increase permission threshold C2 in a state that the accelerator opening of the vehicle detected by the accelerator opening detection sensor Se4 decreases, the engagement pressure of the lock-up clutch 22 by the lock-up control unit 37 is changed to a rapid pressure increase rate c6' larger than a pressure increase rate (which will be referred to as a normal pressure increase rate) c6 in a state that the accelerator opening is constant or increased.

Here, the normal pressure increase rate c6 is determined depending on the traveling state of the vehicle. In this example, it is structured such that a map storing the relation between the transmitted torque of the lock-up clutch 22 (torque output by the engine 11 and the rotary electrical machine 12) and the normal pressure increase rate c6 is provided in the memory 41, and the normal pressure increase rate c6 is obtained according to the actual transmitted torque. More specifically, the normal pressure increase rate c6 is set to have a larger value as the actual transmitted torque gets larger. Note that, besides this, it may be structured that the normal pressure increase rate c6 is derived based on a predetermined arithmetic expression depending on the actual transmitted torque.

Further, in this embodiment, the rapid pressure increase rate c6' is derived by performing calculation such as adding a predetermined value to the normal pressure increase rate c6 obtained as above or multiplying the normal pressure increase rate c6 by a predetermined coefficient. The predetermined value and the predetermined coefficient at this time may be a fixed value, or may be a variable value depending on the transmitted torque, the acceleration opening of the vehicle, or the like. In this example, it is structured that the rapid pressure increase rate c6' is derived by multiplying the normal pressure increase rate c6 by a constant coefficient. Note that the rapid pressure increase rate c6' may also be determined depending on the traveling state of the vehicle, separately from the normal pressure increase rate c6. In this structure, a map storing the relation of the transmitted torque and the rapid pressure increase rate c6' may be provided in the memory 41, and the rapid pressure increase rate c6' may be obtained depending on the actual transmitted torque. Besides this, the rapid pressure increase rate c6' may be derived based on a predetermined arithmetic expression separately from the normal pressure increase rate c6 depending on the actual transmitted torque.

This second control processing is performed after the upshift operation of shift speed is finished, similarly to the first control processing in a state that the accelerator opening is constant or increased. Then, the engagement pressure of the lock-up clutch 22 is increased at the normal pressure increase rate c6 for a while after increasing of the oil pressure is started. When the differential rotation speed DN decreases and becomes equal to or smaller than the pressure increase permission threshold C2, the engagement pressure of the lock-up clutch 22 is changed from the normal pressure increase rate c6 to the rapid pressure increase rate c6'. Thereafter, the engagement pressure of the lock-up clutch 22 is increased at the rapid pressure increase rate c6'. In this manner, the lock-up clutch 22 is engaged relatively early. Note that switching from the normal pressure increase rate c6 to the rapid pressure increase rate c6' is performed by the pressure increase control unit 38 provided in the control unit 31. This pressure increase control unit 38 corresponds to a "pressure increase control unit" in the present invention.

In this embodiment, in time with decreasing of the differential rotation speed DN by increasing the engagement pressure of the lock-up clutch 22 from a state that the differential rotation speed DN is equal to or larger than the pressure increase permission threshold C2, the rotary electrical machine control unit 33 decreases the differential rotation speed DN by controlling the output torque and the rotation speed of the rotary electrical machine 12. That is, the rotary electrical machine control unit 33 decreases the differential rotation speed DN by performing feedback control based on the differential rotation speed DN obtained by the differential rotation obtaining unit 36. Therefore, in this embodiment, the rotary electrical machine control unit 33 also functions as a "synchronization control unit" in the present invention.

Here, the pressure increase permission threshold C2, which defines one criterion of conditions for switching the engagement pressure of the lock-up clutch 22 from the normal pressure increase rate c6 to the rapid pressure increase rate c6' by the pressure increase control unit 38, is set to the magnitude of the differential rotation speed DN that causes generation of smaller shock than the shock generated in the vehicle by decreasing the accelerator opening when the lock-up clutch 22 is engaged. In this embodiment, the pressure increase permission threshold C2 is set to a value equal to the above-described engagement permission threshold C1. That is, the pressure increase permission threshold C2 is set to the magnitude of the differential rotation speed DN at which shock generated when the lock-up clutch 22 is engaged becomes smaller than shock generated in the vehicle by decreasing the accelerator opening.

Figure 8:
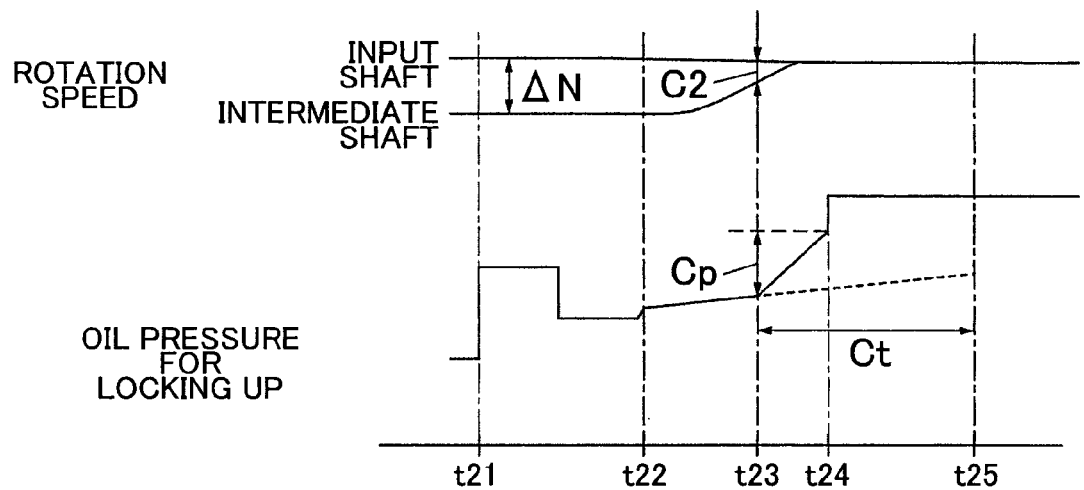
FIG. 8 is a timing chart for describing second control processing according to this embodiment.

FIG. 8 is a timing chart for describing the second control processing. In FIG. 8, from the top in order, there are shown rotation speeds of the input shaft I and the intermediate shaft M and oil pressure controlled by the lock-up control instruction signal S3. Note that it is assumed that the differential rotation speed DN is not smaller than the engagement permission threshold C1 and the pressure increase permission threshold C2 in an initial stage. At time t21, preliminary filling of working fluid to the lock-up clutch 22 is started. Subsequently, after the upshift operation of shift speed is finished (not shown), the oil pressure of working fluid to the lock-up clutch 22 is increased gradually at the normal pressure increase rate c6 from time t22. Accompanying this, the ratio of integral rotation of the input shaft I and the intermediate shaft M increases gradually, and the differential rotation speed DN decreases gradually. When the differential rotation speed DN becomes the pressure increase permission threshold C2 at time t23, the pressure increase control unit 38 switches the pressure increase rate of the oil pressure of working fluid from the normal pressure increase rate c6 to the rapid pressure increase rate c6', which is set to a value larger than the normal pressure increase rate c6. Subsequently, the lock-up control unit 37 increases the pressure by the amount of a predetermined pressure Cp at the rapid pressure increase rate c6' on the basis of the engagement pressure at the time point (time t23) when the differential rotation speed DN becomes the pressure increase permission threshold C2, and thereafter turns the engagement pressure of the lock-up clutch 22 to the complete engagement pressure c7 at time t24, thereby changing the lock-up clutch 22 to the completely engaged state. Note that in FIG. 8, a dashed line shows how the oil pressure changes when the oil pressure of working fluid to the lock-up clutch 22 is increased at the normal pressure increase rate c6 after the differential rotation speed DN becomes equal to or smaller than the pressure increase permission threshold C2.

In a state that, similarly as described above, the accelerator opening is decreased (particularly, the accelerator opening has changed to a fully closed state) when the state determination unit 34 determines to change the lock-up clutch 22 from the released state to the engaged state, the driver thereafter may perform a brake operation or the like for braking the vehicle. In this embodiment, in such a situation, the pressure increase control unit 38 switches the pressure increase rate of the oil pressure of working fluid from the normal pressure increase rate c6 to the rapid pressure increase rate c6' when the differential rotation speed DN becomes the pressure increase permission threshold C2. Thus, by reducing the time to increase the engagement pressure of the lock-up clutch 22 to a sufficient pressure for making the differential rotation speed DN become close to zero, a state that the torque transmitted from the wheels 16 is transmitted as it is to the rotary electrical machine 12 via the lock-up clutch 22 can be established early. Therefore, a state that the regeneration can be performed with high efficiency can be established early. At this time, the pressure increase control unit 38 increases the pressure increase rate for the first time when the differential rotation speed DN becomes equal to or smaller than the pressure increase permission threshold C2. Thus, even when the lock-up clutch 22 is engaged relatively abruptly, shock generated in the vehicle accompanying the engagement operation of the lock-up clutch 22 can be absorbed in shock generated in the vehicle by decreasing the accelerator opening.

The learning control unit 39 is a functional unit which corrects, when the state determination unit 34 determines to switch the shift speed and the switch control unit 35 switches the shift speed, set values of variables of the engagement side control instruction signal S1 thereafter based on set values of one or more variables in the engagement side control instruction signal S1 and an actual behavior of the vehicle when the shift speed is switched according to these set values. Here, variables as objects for which the learning control unit 39 performs learning control include at least one of the filling pressure a1 and the filling time a2 in the preliminary filling phase f1 of the engagement side control instruction signal S1, as well as the target engagement pressure a5 in the pressure increase engagement phase f1. In this example, for each of the engagement side friction engagement elements in each shift speed, the learning control unit 39 takes all of these variables as objects of learning control.

For example, when one or both of initial set values of the filling pressure a1 and the filling time a2 in the preliminary filling phase f1 of the engagement side control instruction signal S1 are smaller compared to a filling pressure and a filling time when the shift operation is performed at an optimal timing, the working fluid filled in the oil chambers of the engagement side friction engagement elements in advance has not reached a sufficient amount. Thus, torque transmission is delayed when shifting the speed, and the output torque decreases. On the other hand, when one or both of initial set values of the filling pressure a1 and the filling time a2 in the preliminary filling phase f1 of the engagement side control instruction signal S1 are larger compared to the filling pressure and the filling time when the shift operation is performed at an optimal timing, the working fluid filled in the oil chambers of the engagement side friction engagement elements in advance becomes excessive, thereby leading to what is called a bind-up. Consequently, the output torque decreases.

Furthermore, for example, when the initial set value of the target engagement pressure a5 in the pressure increase engagement phase f2 of the engagement side control instruction signal S1 is smaller compared to the target engagement pressure when the shift operation is performed at an optimum timing, the torque capacity becomes insufficient and the shift operation is prolonged excessively. On the other hand, when the initial set value of the target engagement pressure a5 in the pressure increase engagement phase f2 of the engagement side control instruction signal S1 is larger compared to the target engagement pressure when the shift operation is performed at an optimum timing, the torque capacity becomes excessively large. Thus, the shift operation is performed abruptly, resulting in generation of shock.

Accordingly, the learning control unit 39 corrects the initial set values of the filling pressure a1 and the filling time a2 as well as the target engagement pressure a5 based on an actual behavior of the vehicle so that, when the shift operation is performed according to the engagement side control instruction signal S1 and the release side control instruction signal S2, decrease of the output torque is suppressed in a shift operation thereafter or the shift operation is performed quickly and smoothly. The corrected instruction parameters 44 are stored in the memory 41 and referred by the switch control unit 35 in a shift operation thereafter. Thus, even when the engine 11 and the transmission 14 have the manufacturing variation or deterioration over time, it is possible to perform the shift operation quickly and smoothly while suppressing decrease of output torque.

However, in this embodiment, when the upshift operation of shift speed and engagement of the lock-up clutch 22 are performed in a state that the accelerator opening decreases in the first control processing, the learning control unit 39 maintains the set values of the instruction parameters 44 of the engagement side control instruction signal S1 as they are. That is, the set values are excluded from the objects of learning control because in such a situation the lock-up clutch 22 is engaged early by giving the first priority to increase of regeneration efficiency, and it is assumed in advance that a certain degree of shock is generated in the vehicle accompanying the shift operation. Accordingly, it is possible to prevent correction of the set values of the instruction parameters 44 of the engagement side control instruction signal S1 to inappropriate values. Note that, for similar reasons, when the second control processing is performed, the learning control unit 39 also maintains the set values of the instruction parameters 44 of the engagement side control instruction signal S1 as they are.

1-4. Procedures of Control Processing

Figure 9:
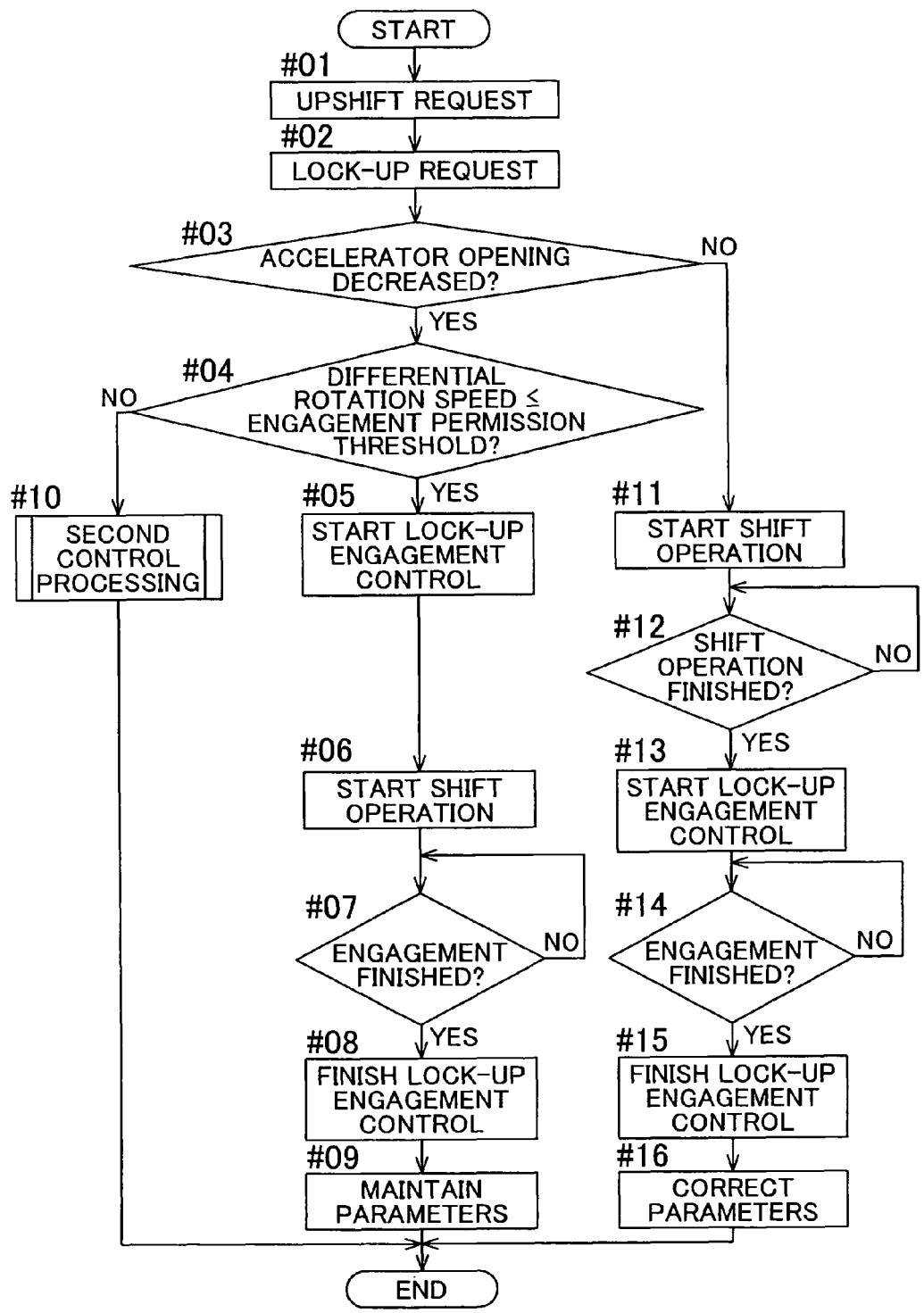
FIG. 9 is a flowchart showing a processing procedure of the first control processing according to this embodiment.
Figure 10:
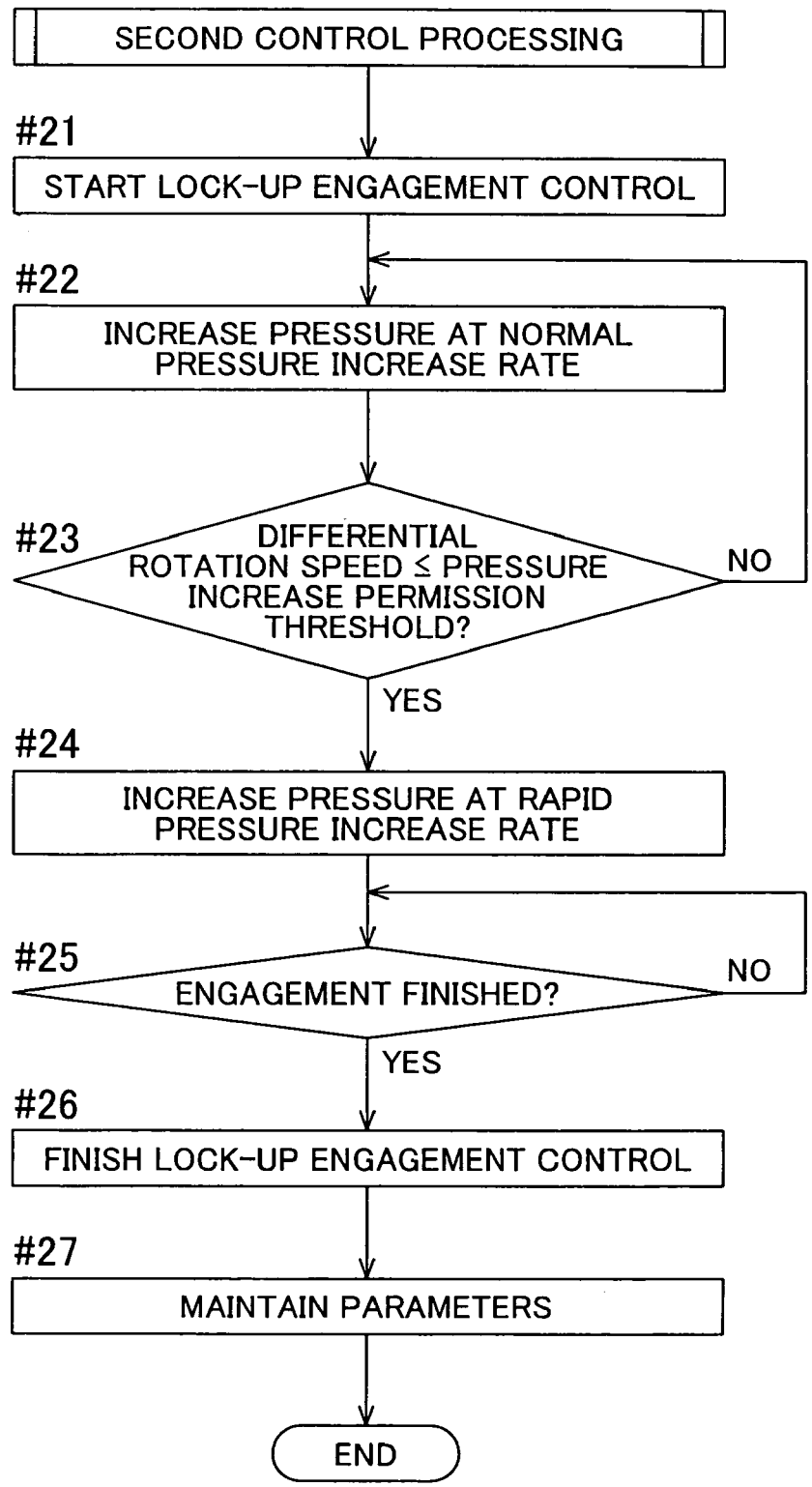
FIG. 10 is a flowchart showing a processing procedure of the second control processing according to this embodiment.

Next, the contents of control of the vehicle drive apparatus 1 according to this embodiment will be described. FIG. 9 is a flowchart showing a processing procedure of control processing (first control processing) of the vehicle drive apparatus 1 according to this embodiment. Further, FIG. 10 is a flowchart showing a processing procedure of the second control processing of step #10 in FIG. 9. The procedures of control processing of the vehicle drive apparatus 1 described below are performed by the functional units 32 to 39 of the control unit 31. When the functional units 32 to 39 of the control unit 31 are structured by a program, the arithmetic processing unit included in the control unit 31 operates as a computer to execute the program forming the functional units 32 to 39.

1-4-1. Procedure of the First Control Processing

In the first control processing according to this embodiment, when the state determination unit 34 determines to upshift the shift speed and change the lock-up clutch 22 from the released state to the engaged state (steps #01, #02), the lock-up control unit 37 determines whether or not the accelerator opening detected by the accelerator opening detection sensor Se4 is decreased (step #03). When it is determined that the accelerator opening is decreased (step #03: Yes), the lock-up control unit 37 then determines whether or not the differential rotation speed DN between the input shaft I and the intermediate shaft M obtained by the differential rotation obtaining unit 36 is equal to or smaller than the engagement permission threshold C1 (step #04). When it is determined that the differential rotation speed DN is larger than the engagement permission threshold C1 (step #04: No), the lock-up control unit 37 performs the second control processing (step #10). A detailed processing procedure of this second control processing will be described later. On the other hand, when it is determined that the differential rotation speed DN is equal to or smaller than the engagement permission threshold C1 (step #04: Yes), the lock-up control unit 37 starts engagement control of the lock-up clutch 22 (step #05).

Thereafter (or at the same time), a shift operation in the transmission 14 by the switch control unit 35 is started (step #06). At this time, an engagement operation of the lock-up clutch 22 is immediately started irrelevantly to the shift operation as described above, and the lock-up clutch 22 is engaged regardless of whether or not the shift operation in the transmission 14 is finished. When determined that a certain time has elapsed by the internal timer (step #07: Yes), the lock-up control unit 37 is finished the lock-up engagement control (step #08). Next, the learning control unit 39 maintains the set values of the instruction parameters 44 of the engagement side control instruction signal S1 (step #09) as they are, and finishes the first control processing.

On the other hand, when it is determined in step #03 that the accelerator opening is not decreased, that is, the accelerator opening is constant or increased (step #03: No), a shift operation in the transmission 14 by the switch control unit 35 is started first (step #11). Thereafter, when the engagement pressure of the engagement side friction elements in the transmission 14 becomes the complete engagement pressure and the shift operation is finished (step #12: Yes), the lock-up control unit 37 starts engagement control of the lock-up clutch 22 (step #13). Here, note that the engagement control of the lock-up clutch 22 refers to a series of operations to increase the oil pressure of the working fluid after the preliminary filling is finished such that the oil pressure finally reaches the complete engagement pressure after changing from the released state through the half-engaged state. Therefore, no problem arises even if the preliminary filling is performed before the shift operation is finished. When it is determined that a certain time has elapsed by the internal timer (step #14: Yes), the lock-up control unit 37 finishes the lock-up engagement control (step #15). Next, the learning control unit 39 corrects the set values of the instruction parameters 44 of the engagement side control instruction signal S1 based on an actual behavior of the vehicle (step #16), and finishes the first control processing.

1-4-2. Procedure of the Second Control Processing

Next, a detailed processing procedure of the second control processing of step #10 will be described. In the second control processing according to this embodiment, the lock-up control unit 37 first starts engagement control of the lock-up clutch 22 (step #21). Here, after the working fluid is preliminary filled in the oil chamber of the lock-up clutch 22, the oil pressure of working fluid is increased gradually at the normal pressure increase rate c6 (step #22). Accordingly, the engagement pressure of the lock-up clutch 22 increases gradually, and the differential rotation speed DN decreases. In this embodiment, the differential rotation speed DN decreases also by the rotary electrical machine control unit 33 controlling the output torque and rotation speed of the rotary electrical machine 12 at the same time. Thereafter, when the differential rotation speed DN becomes equal to or lower than the pressure increase permission threshold C2 (step #23: Yes), the pressure increase control unit 38 changes the pressure increase ratio of the oil pressure of working fluid from the normal pressure increase rate c6 to the rapid pressure increase rate c6' (step #24). Accordingly, the oil pressure of working fluid increases rapidly at the rapid pressure increase rate c6'. When the pressure is increased by the amount of the predetermined pressure Cp at the rapid pressure increase rate c6' on the basis of the engagement pressure at the time point when the differential rotation speed DN becomes the pressure increase permission threshold C2 (step #25: Yes), the lock-up control unit 37 turns the engagement pressure of the lock-up clutch 22 to the complete engagement pressure c7 and finishes the lock-up engagement control (step #26). Next, the learning control unit 39 maintains the set values of the instruction parameters 44 of the engagement side control instruction signal S1 as they are (step #27), and finishes the second control processing.

2. Second Embodiment

Figure 11:
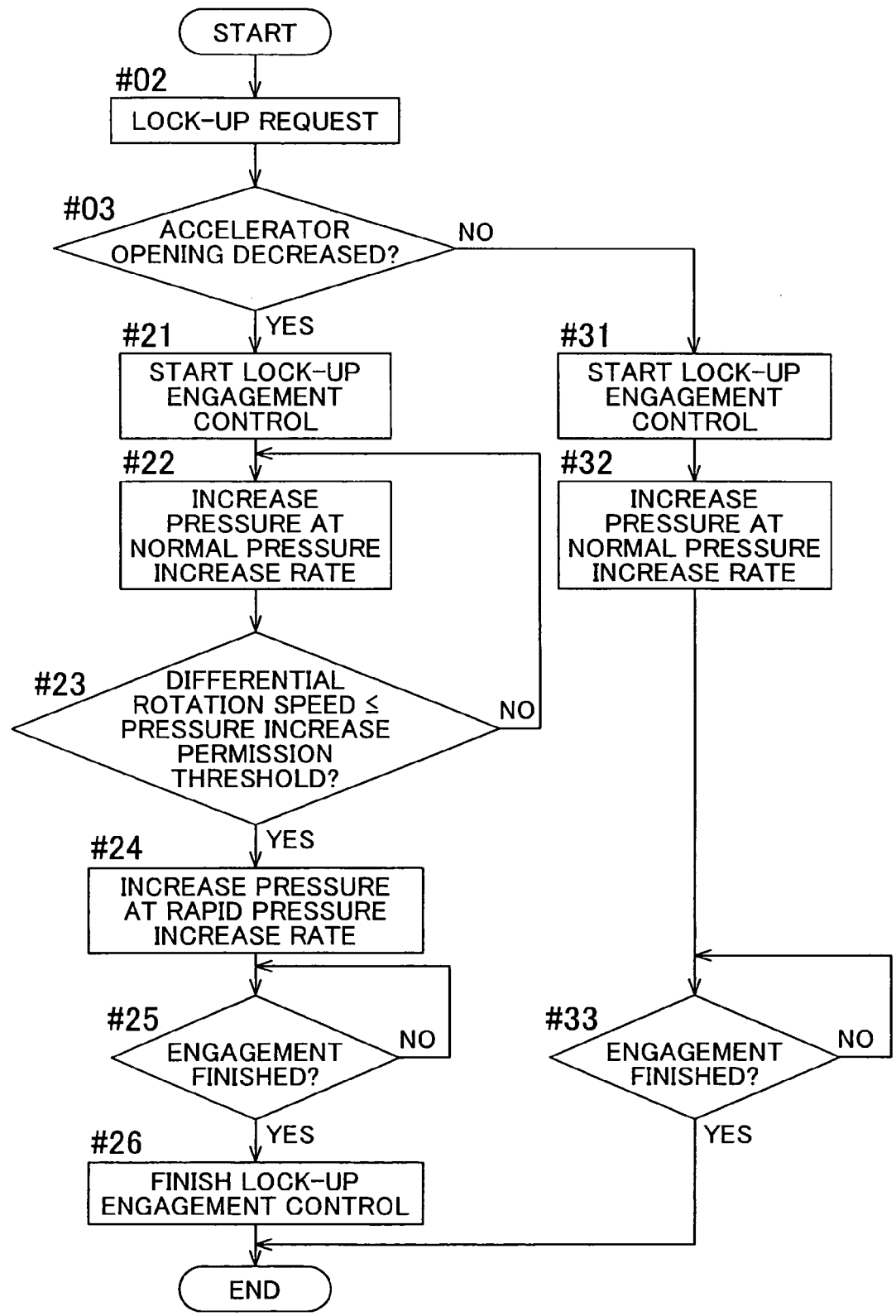
FIG. 11 is a flowchart showing a processing procedure of control processing according to another embodiment.

The second embodiment of the present invention will be described. In this embodiment, basic structures of the drive transmission system, the hydraulic control system, and so on of the vehicle drive apparatus 1 are the same as those in the first embodiment. However, this embodiment is different from the first embodiment in that the lock-up control unit 37 is structured not to perform the first control processing at any time with respect to control processing of the vehicle drive apparatus 1 by the control unit 31, and is structured to perform, when the state determination unit 34 determines to change the lock-up clutch 22 from the released state to the engaged state in a state that the acceleration opening is decreased, only the processing corresponding to the second control processing. The contents of control processing according to this embodiment will be described below. FIG. 11 is a flowchart showing a procedure of the control processing according to this embodiment. Note that in FIG. 11, the contents of processing in common to the processing contents in the first embodiment are denoted by the same step numbers.

When the state determination unit 34 determines to change the lock-up clutch 22 from the released state to the engaged state (step #02), the lock-up control unit 37 determines whether or not the accelerator opening detected by the accelerator opening detection sensor Se4 is decreased (step #03). Note that it is not a precondition that upshift of the shift speed is determined by the state determination unit 34. When it is determined that the accelerator opening is decreased (step #03: Yes), the processing contents of the second control processing in the first embodiment is performed (step #21 to step #26). On the other hand, when it is determined that the accelerator opening is not decreased, that is, the accelerator opening is constant or increased (step #03: No), the lock-up control unit 37 starts engagement control of the lock-up clutch 22 (step #31). Here, after working fluid is preliminary filled in the oil chamber of the lock-up clutch 22, the oil pressure of working fluid is increased gradually at the normal pressure increase rate c6 (step #32). When it is determined that a predetermined time has elapsed by the internal timer (step #33: Yes), the lock-up control unit 37 finishes the lock-up engagement control (step #26).

By such control processing, when the lock-up clutch 22 needs to be engaged in a state that the accelerator opening is decreased, the time for increasing the engagement pressure of the lock-up clutch 22 to the complete engagement pressure is reduced regardless of whether or not there is an upshift request of shift speed, and a state that the torque transmitted from the wheels 16 is transmitted as it is to the rotary electrical machine 12 via the lock-up clutch 22 can be established early. Therefore, a state that the regeneration can be performed with high efficiency can be established early.

Note that in this situation, one of preferred embodiments is structured such that when the accelerator opening is constant or increased similarly to the first embodiment, the learning control unit 39 corrects set values of the instruction parameters 44 based on an actual behavior of the vehicle when a shift operation is performed according to the engagement side control instruction signal S1 and the release side control instruction signal S2.

Other Embodiments (1) In the above-described embodiments, there have been described examples in which, in the second control processing, the lock-up control unit 37 increases the pressure by the amount of the predetermined pressure Cp at the rapid pressure increase rate c6' on the basis of the engagement pressure at the time point when the differential rotation speed DN becomes the pressure increase permission threshold C2, and thereafter turns the engagement pressure of the lock-up clutch 22 to the complete engagement pressure c7, thereby changing the lock-up clutch 22 to the completely engaged state. However, the embodiments of the present invention are not limited thereto. Specifically, a different structure may be adopted for determining finish of the lock-up control. For example, one of preferred embodiments of the present invention is structured to determine finish of the lock-up control by clocking with an internal timer. In this structure, as shown in FIG. 8, the lock-up control unit 37 increases the oil pressure of working fluid to the lock-up clutch 22 at the rapid pressure increase rate c6' until a certain time Ct elapses from the time point (time t23) when the differential rotation speed DN becomes the pressure increase permission threshold C2, and thereafter turns the engagement pressure to the complete engagement pressure c7 at time t25, thereby changing the lock-up clutch 22 to the completely engaged state. Alternatively, one of preferred embodiments of the present invention is structured to determine finish of the lock-up control by combining the above. In this structure, the pressure is increased at the rapid pressure increase rate c6' until the earlier one of a time point when the pressure is increased by the amount of the predetermined pressure Cp at the rapid pressure increase rate c6' on the basis of the engagement pressure at the time point (time t23) when the differential rotation speed DN becomes the pressure increase permission threshold C2, and a time point when the certain time Ct elapses from the time point (time t23) when the differential rotation speed DN becomes the pressure increase permission threshold C2. Thereafter, the engagement pressure is turned to the complete engagement pressure c7, thereby changing the lock-up clutch 22 to the completely engaged state.

(2) In the above-described first embodiment, there have been described examples in which the engagement permission threshold C1 and the pressure increase permission threshold C2 are both set to the magnitude of the differential rotation speed DN that causes generation of smaller shock than the shock generated in the vehicle by decreasing the accelerator opening when the lock-up clutch 22 is engaged, and set to equal values. However, the embodiments of the present invention are not limited thereto. Specifically, one of preferred embodiments of the present invention is structured such that the engagement permission threshold C1 and the pressure increase permission threshold C2 are set to different values from each other.

(3) In the above-described embodiments, there have been described examples in which the transmission 14 has three shift speeds (first speed, second speed and third speed) at different change gear ratios. However, the embodiments of the present invention are not limited thereto. Specifically, as long as it is a multi-speed transmission, the number of shift speeds is not particularly limited. One of preferred embodiments of the present invention is structured having two shift speeds or four or more shift speeds.

(4) In the above-described embodiments, there have been described examples in which the transmission 14 is structured having a planetary gear unit formed of one or more planetary gear mechanisms and a plurality of friction engagement elements, such as clutches and brakes, for engaging or releasing rotation elements of this planetary gear unit to switch the shift speed. However, the embodiments of the present invention are not limited thereto. Specifically, for example, one of the preferred embodiments of the present invention has a structure in which the transmission 14 has a plurality of gear trains fixed on parallel shafts, and switching of shift speed is performed by switching the gears engaged with each other.

(5) In the above-described embodiments, there have been described examples in which the vehicle drive apparatus 1 has a uniaxial structure in which all of the input shaft I, the intermediate shaft M, and the output shaft O are arranged coaxially. However, the embodiments of the present invention are not limited thereto. Specifically, for example, as one of preferred embodiments of the present invention, the present invention may be applied to a vehicle drive apparatus 1 having a structure in which the input shaft I, the intermediate shaft M, and the output shaft O are arranged on different shafts.

The present invention can be used preferably for a control device for controlling a vehicle drive apparatus which includes a fluid coupling having a direct-coupling clutch and a transmission, and outputs rotation of an input member drive-coupled to an engine and a rotary electrical machine to an output member.

What is claimed is:

1. A control device controlling a vehicle drive apparatus which includes a fluid coupling having a direct-coupling clutch and a transmission, and outputs rotation of an input member drive-coupled to an engine and a rotary electrical machine to an output member, the control device comprising:
    a differential rotation obtaining unit that obtains a differential rotation speed which is a difference in rotation speed between an input side of the fluid coupling drive-coupled to the input member and an output side of the fluid coupling drive-coupled to the transmission;
    a direct-coupling control unit that decreases the differential rotation speed by increasing an engagement pressure of the direct-coupling clutch at a normal pressure increase rate determined depending on a traveling state of a vehicle so as to change the direct-coupling clutch from a released state to an engaged state; and
    a pressure increase control unit that changes to a rapid pressure increase rate larger than the normal pressure increase rate for increasing the engagement pressure by the direct-coupling control unit when the differential rotation speed becomes equal to or smaller than a predetermined pressure increase permission threshold in a state that an accelerator opening of the vehicle decreases, wherein
    the direct-coupling control unit increases the pressure by an amount of a predetermined pressure at the rapid pressure increase rate on the basis of the engagement pressure at a time point when the differential rotation speed becomes the pressure increase permission threshold, and thereafter turns the engagement pressure to a complete engagement pressure.

2. The control device according to claim 1, wherein
    the direct-coupling control unit increases the pressure at the rapid pressure increase rate until a certain time elapses from a time point when the differential rotation speed becomes the pressure increase permission threshold, and thereafter turns the engagement pressure to the complete engagement pressure.

3. The control device according to claim 1, further comprising
    a synchronization control unit that decreases the differential rotation speed by controlling output torque and a rotation speed of the rotary electrical machine in time with decreasing of the differential rotation speed by increasing the engagement pressure of the direct-coupling clutch.

4. The control device according to claim 1, wherein
    the pressure increase permission threshold is set to a magnitude of the differential rotation speed that causes generation of shock smaller than shock generated in the vehicle by decreasing the accelerator opening when the direct-coupling clutch is engaged.

5. The control device according to claim 1, wherein
    the direct-coupling control unit outputs a direct-coupling control instruction signal for engaging the direct-coupling clutch; and
    the direct-coupling control instruction signal is made by regulating with one or more variables a preset reference waveform having a preliminary filling phase for filling working fluid in an engagement side oil chamber of the direct-coupling clutch and a pressure increase engagement phase for increasing an oil pressure of the working fluid to engage the direct-coupling clutch.

6. The control device according to claim 5, wherein
the variables include at least a pressure increase rate in the pressure increase engagement phase of the direct-coupling control instruction signal.

7. The control device according to claim 6, wherein
the variables further include one or both of a filling pressure and a filling time in the preliminary filling phase of the direct-coupling control instruction signal.

8. The control device according to claim 2, further comprising
a synchronization control unit that decreases the differential rotation speed by controlling output torque and a rotation speed of the rotary electrical machine in time with decreasing of the differential rotation speed by increasing the engagement pressure of the direct-coupling clutch.

9. The control device according to claim 8, wherein
the pressure increase permission threshold is set to a magnitude of the differential rotation speed that causes generation of shock smaller than shock generated in the vehicle by decreasing the accelerator opening when the direct-coupling clutch is engaged.

* * * * *